(12) United States Patent
Kim et al.

(10) Patent No.: US 12,067,946 B2
(45) Date of Patent: Aug. 20, 2024

(54) DISPLAY DEVICE

(71) Applicant: Samsung Display Co., LTD., Yongin-si (KR)

(72) Inventors: Il Nam Kim, Yongin-si (KR); Hyun Dae Lee, Yongin-si (KR); Kang Bin Jo, Yongin-si (KR); Go Eun Cha, Yongin-si (KR); Hee Chul Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/191,765

(22) Filed: Mar. 28, 2023

(65) Prior Publication Data

US 2023/0402014 A1    Dec. 14, 2023

(30) Foreign Application Priority Data

Jun. 9, 2022  (KR) .................. 10-2022-0070338

(51) Int. Cl.
   *G09G 3/3266*    (2016.01)
   *G06F 3/041*     (2006.01)
   *G06V 40/13*     (2022.01)

(52) U.S. Cl.
   CPC ....... *G09G 3/3266* (2013.01); *G06F 3/04184* (2019.05); *G06V 40/1318* (2022.01);
   (Continued)

(58) Field of Classification Search
   CPC .......... G09G 3/3266; G09G 2310/061; G09G 2354/00; G09G 2360/14; G09G 2300/0426; G09G 2300/0819; G09G 2300/0842; G09G 2300/0861; G09G 2310/0251; G09G 2310/0262; G09G 2310/08; G09G 3/2092; G09G 3/3233; G09G 3/3225; G09G 2300/0809; G09G 2360/142; G06F 3/04184; G06F 3/04166; G06V 40/1318; G06K 19/0718
   See application file for complete search history.

(56) References Cited

U.S. PATENT DOCUMENTS

2016/0014857 A1*  1/2016  Park ................. H05B 45/60
                                           315/294
2018/0174525 A1*  6/2018  Kim .................. G09G 3/3291
(Continued)

FOREIGN PATENT DOCUMENTS

KR    10-2020-0055597 A    5/2020

*Primary Examiner* — Jose R Soto Lopez
(74) *Attorney, Agent, or Firm* — Lewis Roca Rothgerber Christie LLP

(57) ABSTRACT

A display device includes: a display panel; a scan driver to provide scan signals to scan lines; an emission driver to provide emission control signals to emission control lines; and a readout circuit to receive a sensing signal from a readout line. The display panel includes: a first pixel in a first row, and connected to a first sub-scan line from among the scan lines, and a first emission control line; a first photo sensor in the first row, and connected to the first sub-scan line, a reset control line, and the readout line; a second pixel in a second row, and connected to a second sub-scan line from among the scan lines, and a second emission control line; and a second photo sensor in the second row, and connected to the second sub-scan line, a third emission control line, and the readout line.

20 Claims, 16 Drawing Sheets

(52) U.S. Cl.
CPC ... *G09G 2310/061* (2013.01); *G09G 2354/00* (2013.01); *G09G 2360/14* (2013.01)

(56) References Cited

U.S. PATENT DOCUMENTS

| | | | |
|---|---|---|---|
| 2021/0158751 A1* | 5/2021 | Cha | H10K 65/00 |
| 2021/0200366 A1* | 7/2021 | Bok | H10K 59/122 |
| 2021/0201837 A1* | 7/2021 | Kuo | G09G 3/3677 |
| 2023/0108416 A1* | 4/2023 | Yin | G09G 3/3291 |
| | | | 345/212 |

* cited by examiner

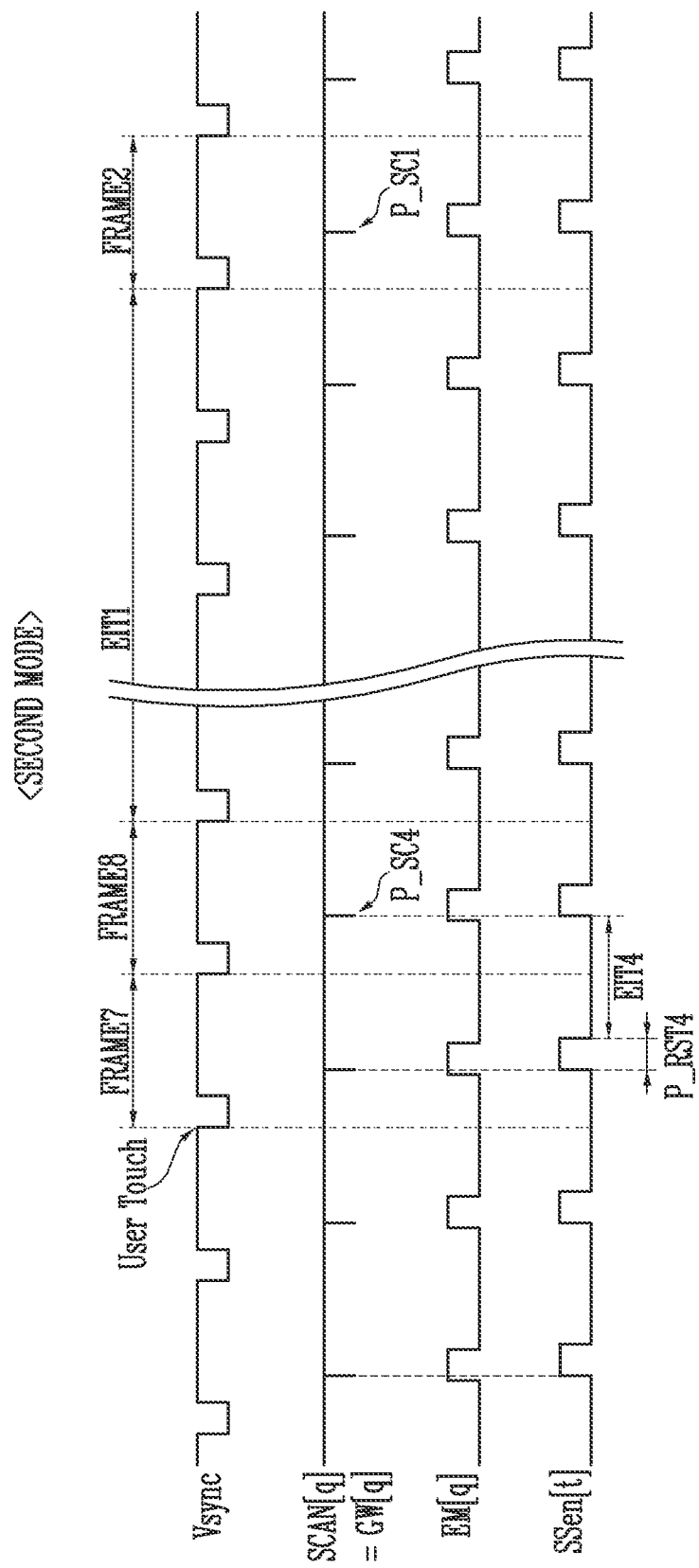

DISPLAY DEVICE

CROSS-REFERENCE TO RELATED APPLICATION

This application claims priority to and the benefit of Korean Patent Application No. 10-2022-0070338, filed on Jun. 9, 2022, the entire content of which is incorporated by reference herein.

BACKGROUND

1. Field

Aspects of embodiments of the present disclosure relate to a display device.

2. Description of the Related Art

Recently, as a display device, such as a smart phone or a tablet PC, is used in various fields, a biometric information authentication method using a user's fingerprint or the like is widely used. In order to provide a fingerprint sensing function, a fingerprint sensor may be provided in a form in which the fingerprint sensor is embedded in or attached to the display device.

A fingerprint sensor of a light sensing method may include a light source and a photo sensor. The photo sensor may obtain fingerprint information by receiving reflected light or the like generated by the user's fingerprint.

The above information disclosed in this Background section is for enhancement of understanding of the background of the present disclosure, and therefore, it may contain information that does not constitute prior art.

SUMMARY

One or more embodiments of the present disclosure are directed to a display device including a photo sensor. The display device may be capable of sensing fingerprint information and sensing a touch concurrently (e.g., simultaneously or substantially simultaneously) according to reflected light or the like received through the photo sensor.

One or more embodiments of the present disclosure are directed to a display device capable of sufficiently securing a reset time in sensing fingerprint information through a photo sensor.

According to one or more embodiments of the present disclosure, a display device includes: a display panel including scan lines, emission control lines, a readout line, and a reset control line; a scan driver configured to provide scan signals to the scan lines; an emission driver configured to provide emission control signals to the emission control lines; and a readout circuit configured to receive a sensing signal from the readout line in response to the scan signals. The display panel further includes: a first pixel in a first row of a display area, and connected to a first sub-scan line from among the scan lines, and a first emission control line from among the emission control lines; a first photo sensor in the first row, and connected to the first sub-scan line, the reset control line, and the readout line; a second pixel in a second row of the display area, and connected to a second sub-scan line from among the scan lines, and a second emission control line from among the emission control lines; and a second photo sensor in the second row, and connected to the second sub-scan line, a third emission control line from among the emission control lines, and the readout line.

In an embodiment, the display area of the display panel may be divided into a plurality of pixel rows; at least a portion of the plurality of pixel rows may correspond to the second row; and a remaining portion of the plurality of pixel rows may correspond to the first row.

In an embodiment, the first sub-scan line may correspond to a p-th scan line from among the scan lines, where p may be a natural number, and the second sub-scan line may correspond to a q-th scan line from among the scan lines, where q may be a natural number.

In an embodiment, the first emission control line may correspond to a p-th emission control line from among the emission control lines; the second emission control line may correspond to a q-th emission control line from among the emission control lines; and the third emission control line may correspond to an r-th emission control line from among the emission control lines, where r may be a natural number less than q.

In an embodiment, the first photo sensor may include: a first light receiving element; a first sub-sensor transistor configured to control a current flowing to the readout line in response to a voltage of an electrode of the first light receiving element; a second sub-sensor transistor electrically connected between the first sub-sensor transistor and the readout line, and including a gate electrode connected to the first sub-scan line; and a third sub-sensor transistor electrically connected between a reference power line and the electrode of the first light receiving element, and including a gate electrode connected to the reset control line.

In an embodiment, the second photo sensor may include: a second light receiving element; a fourth sub-sensor transistor configured to control a current flowing to the readout line in response to a voltage of an electrode of the second light receiving element; a fifth sub-sensor transistor electrically connected between the fourth sub-sensor transistor and the readout line, and including a gate electrode connected to the second sub-scan line; and a sixth sub-sensor transistor electrically connected between the reference power line and the electrode of the second light receiving element, and including a gate electrode connected to the third emission control line.

In an embodiment, the emission driver may be configured to change a frequency of an emission control signal supplied to the third emission control line in response to a first mode and a second mode.

In an embodiment, in the first mode, the emission driver may be configured to control the frequency of the emission control signal supplied to the third emission control line to correspond to a frequency of a reset signal supplied to the reset control line.

In an embodiment, in the first mode, the frequency of the emission control signal supplied to the third emission control line may be less than a frequency of emission control signals supplied to the first and second emission control lines.

In an embodiment, in the second mode, the emission driver may be configured to control the frequency of the emission control signal supplied to the third emission control line to correspond to a frequency at which the scan driver supplies the scan signals to the scan lines.

In an embodiment, the emission driver may be configured to change a length of a period in which an emission control signal supplied to the third emission control line has a high level in response to a first mode and a second mode.

In an embodiment, the length of the period in which the emission control signal supplied to the third emission control line has the high level in the first mode is longer than the length of the period in which the emission control signal supplied to the third emission control line has the high level in the second mode.

In an embodiment, the second photo sensor may be configured to be reset by a reset voltage supplied from a reference power line in the period in which the emission control signal supplied to the third emission control line has the high level.

According to one or more embodiments of the present disclosure, a display device includes: a display panel including scan lines, emission control lines, a sensing scan line, a readout line, and a reset control line; a scan driver configured to provide scan signals to the scan lines; an emission driver configured to provide emission control signals to the emission control lines; a sensing scan driver configured to provide a sensing scan signal to the sensing scan line; and a readout circuit configured to receive a sensing signal from the readout line in response to the scan signals. The display panel further includes: a first pixel in a first row of a display area, and connected to a first sub-scan line from among the scan lines, and a first emission control line from among the emission control lines; a first photo sensor in the first row, and connected to the first sub-scan line, the reset control line, and the readout line; a second pixel in a second row of the display area, and connected to a second sub-scan line from among the scan lines, and a second emission control line from among the emission control lines; and a second photo sensor in the second row, and connected to the second sub-scan line, the sensing scan line, and the readout line.

In an embodiment, the first photo sensor may include: a first light receiving element; a first sub-sensor transistor configured to control a current flowing to the readout line in response to a voltage of an electrode of the first light receiving element; a second sub-sensor transistor electrically connected between the first sub-sensor transistor and the readout line, and including a gate electrode connected to the first sub-scan line; and a third sub-sensor transistor electrically connected between a reference power line and the electrode of the first light receiving element, and including a gate electrode connected to the reset control line.

In an embodiment, the second photo sensor may include: a second light receiving element; a fourth sub-sensor transistor configured to control a current flowing to the readout line in response to a voltage of an electrode of the second light receiving element; a fifth sub-sensor transistor electrically connected between the fourth sub-sensor transistor and the readout line, and including a gate electrode connected to the second sub-scan line; and a sixth sub-sensor transistor electrically connected between the reference power line and the electrode of the second light receiving element, and including a gate electrode connected to the sensing scan line.

In an embodiment, the sensing scan driver may be configured to change a frequency of the sensing scan signal supplied to the sensing scan line in response to a first mode and a second mode.

In an embodiment, in the first mode, the sensing scan driver may be configured to control a frequency of the sensing scan signal supplied to the sensing scan line to correspond to a frequency of a reset signal supplied to the reset control line.

In an embodiment, in the second mode, the sensing scan driver may be configured to control a frequency of the sensing scan signal supplied to the sensing scan lines to correspond to a frequency at which the scan driver supplies the scan signals to the scan lines.

In an embodiment, the sensing scan driver may be configured to change a length of a period in which the sensing scan signal supplied to the sensing scan line has a high level in response to a first mode and a second mode.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 16 is a waveform diagram illustrating an example of an operation in the second mode of the second pixel and the second photo sensor of FIG. 14.

DETAILED DESCRIPTION

Figure 1:
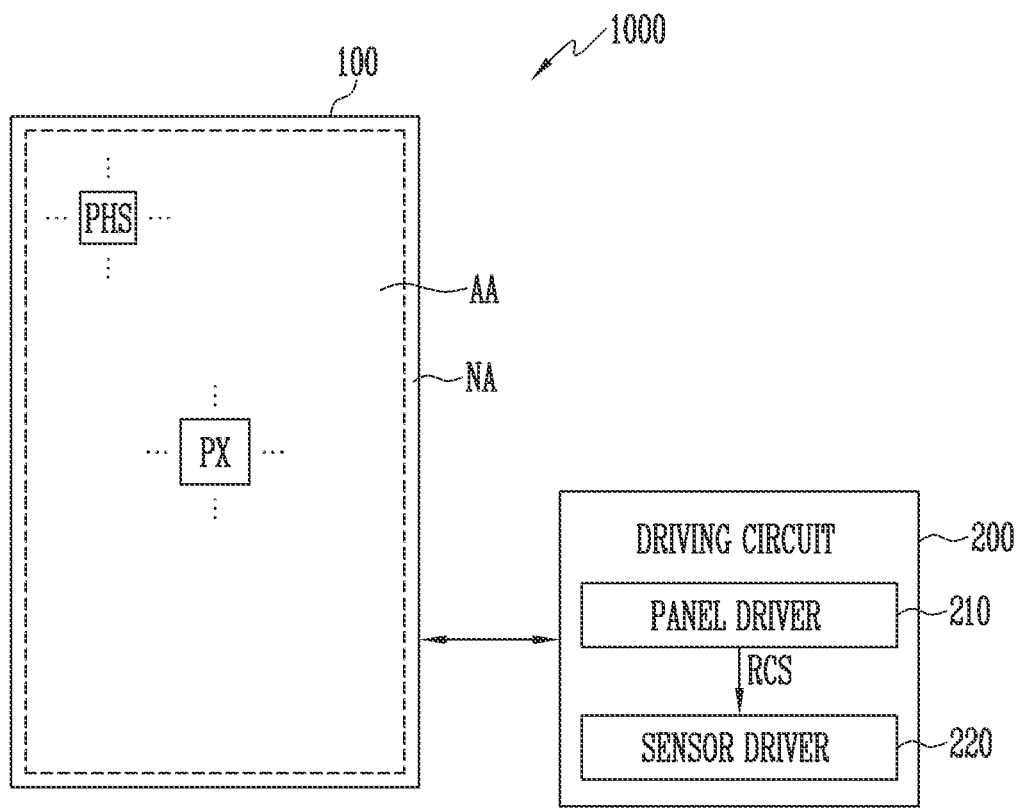
FIG. 1 is a block diagram illustrating a display device according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

In addition, as used in the present specification, when a portion of a layer, a film, an area, a plate, or the like is described as being formed on another portion, a forming direction thereof is not limited to an upper direction, but includes forming the portion on a side surface or in a lower direction. On the other hand, when a portion of a layer, a film, an area, a plate, or the like is described as being formed "under" or "underneath" another portion, the portion may be formed "directly beneath" another portion, or an intermediate portion may be between the portion and the other portion, unless otherwise described.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device according to one or more embodiments of the present disclosure. As shown in FIG. 1, the display device 1000 according to one or more embodiments of the present disclosure may include a display panel 100, and a driving circuit 200 for driving the display panel 100.

For convenience of illustration, the display panel 100 and the driving circuit 200 are shown separately in FIG. 1, but the present disclosure is not limited thereto. According to an embodiment, an entirety or a portion of the driving circuit 200 may be integrally implemented on the display panel 100.

Referring to FIG. 1, the display device 1000 may include the display panel 100 and the driving circuit 200. In an embodiment, the driving circuit 200 may include a panel driver 210 and a sensor driver 220.

The display device 1000 may be implemented as a self-emission display device including a plurality of self-emission elements. For example, the display device 1000 may be an organic light emitting display device including organic light emitting elements. However, the present disclosure is not limited thereto, and the display device 1000 may be implemented as a display device including inorganic light emitting elements, a display device including light emitting elements configured of an inorganic material and an organic material in combination with each other, or a display device for displaying an image using a quantum dot or the like.

The display device 1000 may be a flat or substantially flat display device, a flexible display device, a curved display device, a foldable display device, a bendable display device, or a rollable display device. In addition, the display device may be applied to a transparent display device, a head-mounted display device, a wearable display device, or the like.

The display panel 100 may include a display area AA and a non-display area NA. The display area AA may be an area where a pixel PX is provided. The pixel PX may be referred to as a sub-pixel or a light-emitting pixel. The pixel PX may include at least one light emitting element. For example, the light emitting element may include a light emitting layer (e.g., an organic light emitting layer). A portion where the light emitting element emits light may be defined as a light emitting area. The display device 1000 may display an image in the display area AA by driving the pixel PX in response to image data.

The non-display area NA may be an area provided around (e.g., adjacent to) the display area AA. For example, the non-display area NA may surround (e.g., around a periphery of) the display area AA. In an embodiment, the non-display area NA may comprehensively refer to an area other than the display area AA of the display panel 100. For example, the non-display area NA may include a line area, a pad area, various dummy areas, and/or the like.

In an embodiment, a photo sensor PHS may be included at (e.g., in or on) the display area AA. The photo sensor PHS may be referred to as a sensor pixel. The photo sensor PHS may include a light receiving element including a light receiving layer. The light receiving layer of the light receiving element may be disposed to be spaced apart from the light emitting layer of the light emitting element at (e.g., in or on) the display area AA.

In an embodiment, a plurality of photo sensors PHS may be distributed to be spaced apart from each other over an entire or substantially an entire area of the display area AA. However, the present disclosure is not limited thereto, and a portion (e.g., only a portion) of the display area AA may be defined (e.g., may be set) as a sensing area (e.g., a predetermined sensing area), and the photo sensors PHS may be provided at (e.g., in or on) the corresponding sensing area. In addition, the photo sensor PHS may also be included at (e.g., in or on) at least a portion of the non-display area NA.

In an embodiment, the photo sensor PHS may sense light emitted from a light source (e.g., the light emitting element of the pixel PX) that is reflected by an external object (e.g., a user's finger or the like). For example, a user's fingerprint may be sensed through the photo sensor PHS. Hereinafter, for convenience, an example in which the photo sensor PHS is used in the context for fingerprint sensing is described in more detail, but the present disclosure is not limited thereto, and in various embodiments, the photo sensor PHS may be used to sense various suitable biometric information, such as an iris, a vein, and/or the like.

In an embodiment, a user's touch may be sensed through the photo sensor PHS by sensing light emitted from the light source (e.g., the light emitting element of the pixel PX) and reflected.

The driving circuit 200 may include a panel driver 210 and a sensor driver 220. For example, the panel driver 210 and the sensor driver 220 may be implemented as integrated circuits that are independent of each other, or may be implemented together as a single integrated circuit. For example, at least a portion of the sensor driver 220 may be included in the panel driver 210, or may operate in conjunction with the panel driver 210.

The panel driver 210 may scan the pixel PX of the display area AA, and may supply a data signal corresponding to the image data (e.g., of an image) to the pixel PX. The display panel 100 may display an image corresponding to the data signal.

In an embodiment, the panel driver 210 may supply a driving signal for light sensing (e.g., for the fingerprint sensing) to the pixel PX. The driving signal may be provided so that the pixel PX emits light to operate as a light source for the photo sensor PHS. In an embodiment, the panel driver 210 may also supply the driving signal and/or another driving signal for the light sensing to the photo sensor PHS. However, the present disclosure is not limited thereto, and the driving signals for the light sensing may be provided by the sensor driver 220.

The sensor driver 220 may detect biometric information, such as a user's fingerprint, based on a sensing signal received from the photo sensor PHS. In an embodiment, the sensor driver 220 may also supply the driving signals to the photo sensor PHS and/or the pixel PX.

In addition, the sensor driver 220 may sense a user's touch based on a sensing signal received from the photo sensor PHS.

In an embodiment, the panel driver 210 may provide a readout control signal RCS to the sensor driver 220, and the sensor driver 220 may read out (e.g., may sample) the sensing signal in conjunction with the panel driver 210 based on the readout control signal RCS. For example, the sensor driver 220 may read out (e.g., may sample) the sensing signal from at least one pixel row (e.g., one horizontal line) unit in response to the readout control signal RCS.

Figure 2:
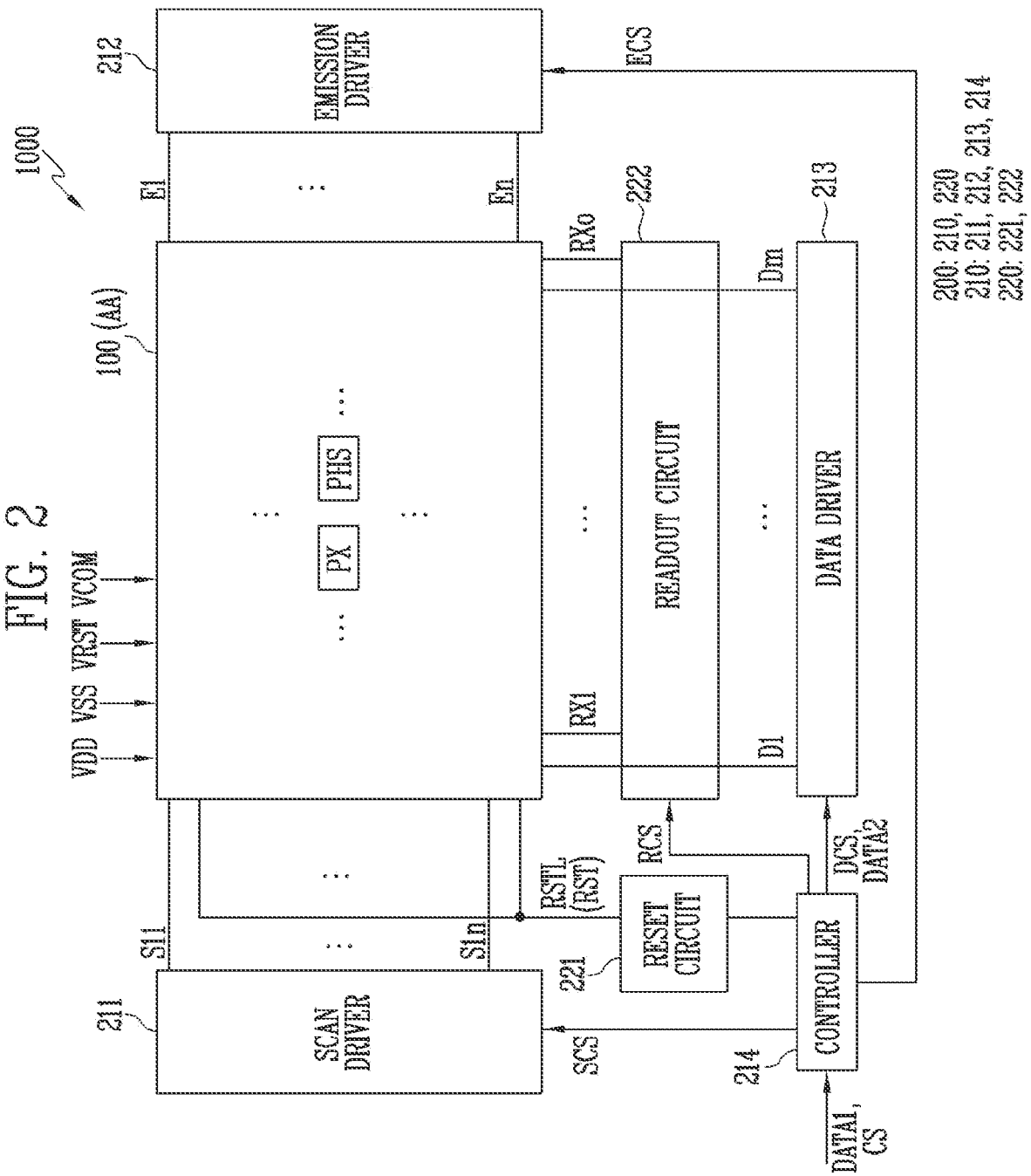
FIG. 2 is a block diagram illustrating a display device according to one or more embodiments of the present disclosure.
Figure 3:
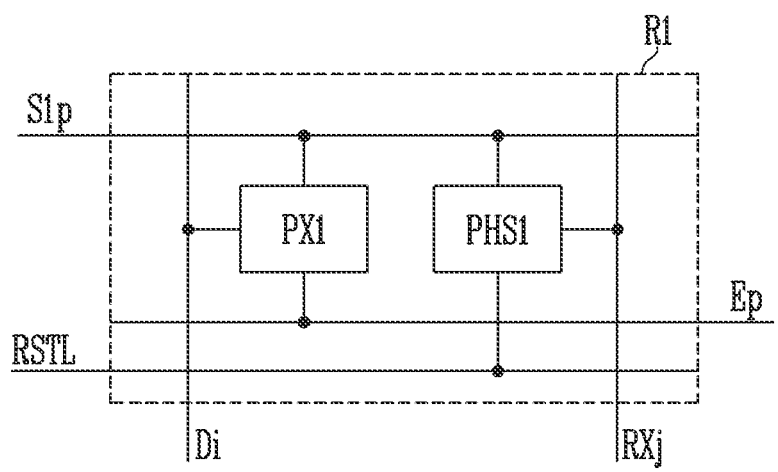
FIG. 3 is a diagram illustrating an example of dispositions of a first pixel and a first photo sensor in a first row of a display area of a display panel included in the display device of FIG. 2.
Figure 4:
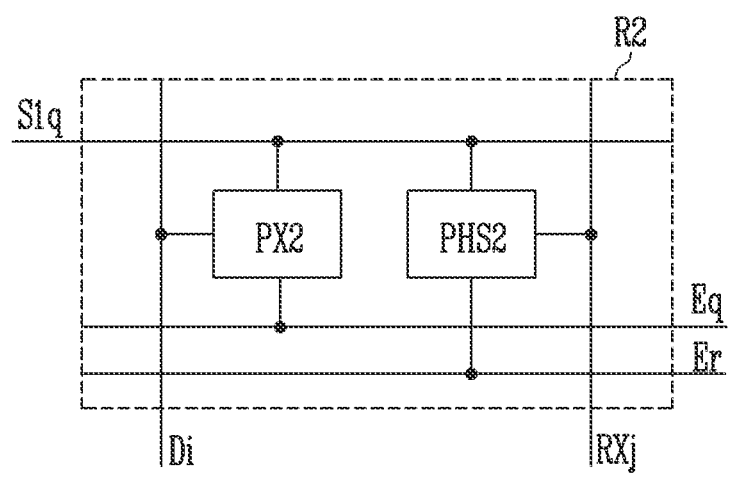
FIG. 4 is a diagram illustrating an example of dispositions of a second pixel and a second photo sensor in a second row of the display area of the display panel included in the display device of FIG. 2.
Figure 5:
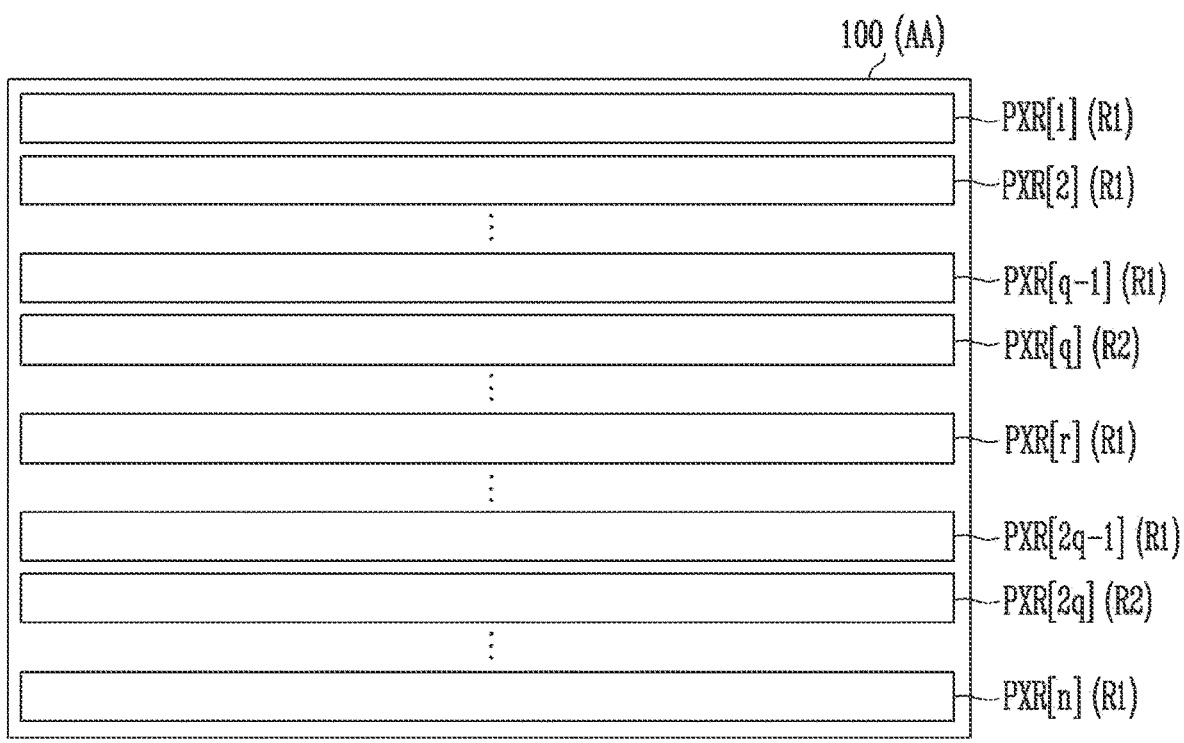
FIG. 5 is a diagram illustrating an example of the display panel included in the display device of FIG. 2.

FIG. 2 is a block diagram illustrating a display device according to one or more embodiments of the present disclosure. FIG. 3 is a diagram illustrating an example of dispositions of a first pixel and a first photo sensor in a first row of a display area of a display panel included in the display device of FIG. 2. FIG. 4 is a diagram illustrating an example of dispositions of a second pixel and a second photo sensor in a second row of the display area of the display panel included in the display device of FIG. 2. FIG. 5 is a diagram illustrating an example of the display panel included in the display device of FIG. 2.

Referring to FIGS. 1 and 2, the display device 1000 may include the display panel 100 and the driving circuit 200.

The display panel 100 may include signal lines, pixels PX, and photo sensors PHS. The signal lines may include first scan lines S11 to S1$n$ (e.g., scan lines), data lines D1 to D$m$, emission control lines E1 to E$n$, readout lines RX1 to RX$o$, and a reset control line RSTL (e.g., a reset line). Here, each of n, m, and o may be a natural number.

The pixels PX may be disposed or positioned at (e.g., in or on) an area (e.g., a pixel area) partitioned by the first scan lines S11 to S1$n$ and the data lines D1 to D$m$. The photo sensors PHS may be disposed or positioned at (e.g., in or on) an area partitioned by the first scan lines S11 to S1n and the readout lines RX1 to RXo.

In an embodiment, the pixels PX and the photo sensors PHS may be arranged in a two-dimensional array at (e.g., in or on) the display area AA of the display panel 100. For example, the display area AA of the display panel 100 may be divided into a plurality of pixel rows and a plurality of pixel columns, and each of the pixels PX and the photo sensors PHS may be disposed in a corresponding pixel row from among the pixel rows and a corresponding pixel column from among the pixel columns. However, the present disclosure is not limited thereto.

Each of the pixels PX may be electrically connected to at least one of the first scan lines S11 to S1n, at least one of the emission control lines E1 to En, and one of the data lines D1 to Dm.

In an embodiment, the first photo sensor of the photo sensors PHS may be electrically connected to one of the first scan lines S11 to S1n, one of the readout lines RX1 to RXo, and the reset control line RSTL.

In an embodiment, the second photo sensor from among the photo sensors PHS may be electrically connected to one of the first scan lines S11 to S1n, one of the readout lines RX1 to RXo, and at least one of the emission control lines E1 to En.

A connection configuration between the pixel PX, the photo sensor PHS, and the signal lines is described in more detail hereinafter with reference to FIGS. 3 and 4. In FIG. 3, a first pixel PX1 and a first photo sensor PHS1 that are disposed in a first row R1 of the display area AA of the display panel 100 are illustrated, and in FIG. 4, a second pixel PX2 and a second photo sensor PHS2 that are disposed in a second row R2 of the display area AA of the display panel 100 are illustrated.

For convenience of illustration, in each of FIGS. 3 and 4, only one pixel (e.g., the first pixel PX1 or the second pixel PX2) from among the plurality of pixels PX arranged in the first or second rows R1 and R2, and only one photo sensor (e.g., the first photo sensor PHS1 or the second photo sensor PHS2) from among the plurality of photo sensors PHS arranged in the first or second rows R1 and R2 are illustrated.

The first row R1 shown in FIG. 3 may correspond to a p-th pixel row from among the plurality of pixel rows, and the second row R2 shown in FIG. 4 may correspond to a q-th pixel row from among the plurality of pixel rows. Here, each of p and q may be a natural number.

In addition, for convenience, a case where the first pixel PX1 shown in FIG. 3 and the second pixel PX2 shown in FIG. 4 are disposed in the same pixel column as each other, and the first photo sensor PHS1 shown in FIG. 3 and the second photo sensor PHS2 shown in FIG. 4 are disposed in the same pixel column as each other is described in more detail hereinafter.

First, a connection configuration between the first pixel PX1 and the first photo sensor PHS1 disposed in the first row R1 will be described in more detail with reference to FIG. 3. Referring to FIG. 3, the first pixel PX1 may be electrically connected to a p-th first scan line S1p (hereinafter, referred to as a first sub-scan line) from among the first scan lines S11 to S1n, a p-th emission control line Ep (hereinafter, referred to as a first emission control line) from among the emission control lines E1 to En, and an i-th data line Di (hereinafter, referred to as a data line) from among the data lines D1 to Dm. Here, i may be a natural number. The first pixel PX1 may emit light having a luminance corresponding to a data signal provided to the data line Di, based on a first scan signal provided to the first sub-scan line S1p and an emission control signal provided to the first emission control line Ep.

In addition, the first photo sensor PHS1 may be electrically connected the first sub-scan line S1p, a j-th readout line RXj (hereinafter, referred to as a readout line) from among the readout lines RX1 to RXo, and the reset control line RSTL. Here, j may be a natural number. The first photo sensor PHS1 may output an electrical signal (e.g., a sensing signal, such as a current/voltage) corresponding to light sensed through the readout line RXj, based on the first scan signal provided to the first sub-scan line S1p and a reset signal (e.g., a reset control signal) provided to the reset control line RSTL. Based on the sensing signal output through the first photo sensor PHS1, a user's fingerprint may be sensed (e.g., may be identified).

Next, a connection configuration between the second pixel PX2 and the second photo sensor PHS2 disposed in the second row R2 will be described in more detail with reference to FIG. 4. Referring to FIG. 4, the second pixel PX2 may be electrically connected to a q-th first scan line S1q (hereinafter, referred to as a second sub-scan line) from among the first scan lines S11 to S1n, a q-th emission control line Eq (hereinafter, referred to as a second emission control line) from among the emission control lines E1 to En, and the data line Di. The second pixel PX2 may emit light having a luminance corresponding to the data signal provided to the data line Di, based on the first scan signal provided to the second sub-scan line S1q and the emission control signal provided to the second emission control line Eq.

In addition, the second photo sensor PHS2 may be electrically connected to the second sub-scan line S1q and the readout line RXj.

In an embodiment, the second photo sensor PHS2 may be electrically connected to an r-th emission control line Er (hereinafter, referred to as a third emission control line) from among the emission control lines E1 to En. Here, r may be a natural number. For example, r may be a natural number that is less than q, but the present disclosure is not limited thereto.

The second photo sensor PHS2 may output an electrical signal (e.g., a sensing signal, such as a current/voltage) corresponding to light sensed through the readout line RXj, based on the first scan signal provided to the second sub-scan line S1q and the emission control signal provided to the third emission control line Er. Based on the sensing signal output through the second photo sensor PHS2, the user's fingerprint or a user's touch may be sensed. For example, when the display device 1000 is driven in a first mode, the user's fingerprint may be sensed based on the sensing signal output through the second photo sensor PHS2, and when the display device 1000 is driven in a second mode, the user's touch may be sensed based on the sensing signal output through the second photo sensor PHS2.

The first row R1 in which the first pixel PX1 and the first photo sensor PHS1 are disposed as shown in FIG. 3, and the second row R2 in which the second pixel PX2 and the second photo sensor PHS2 are disposed as shown in FIG. 4 are described in more detail with reference to FIG. 5.

Referring further to FIG. 5, the display area AA of the display panel 100 may be divided into a plurality of pixel rows PXR[1] to PXR[n].

In an embodiment, at least a portion of the plurality of pixel rows PXR[1] to PXR[n] may be (e.g., may be set as) the second row R2. Here, as described above with reference to FIG. 4, the second row R2 may correspond to an area in which the second photo sensor PHS2 for sensing the user's touch, as well as the user's fingerprint, is disposed.

For example, each q-th pixel row from among the plurality of pixel rows PXR[1] to PXR[n] may be (e.g., may be set as) the second row R2. For example, a q-th pixel row PXR[q] and a 2q-th pixel row PXR[2q] may be (e.g., may be set as) the second row R2 (e.g., a plurality of second rows R2) in which the second photo sensor PHS2 is disposed.

Here, q may be determined according to a driving frequency (or a frame frequency) of the display device 1000, a touch driving frequency, and a fingerprint sensing frequency. For example, q may be determined as a ratio of the frame frequency and/or the touch driving frequency of the display device 1000 to the fingerprint sensing frequency. For example, when the frame frequency and the touch driving frequency of the display device 1000 are 120 Hz and the fingerprint sensing frequency is 10 Hz, q may be 12. However, the present disclosure is not limited thereto, and q may be variously determined (e.g., variously set) as needed or desired.

As described above, the photo sensors (e.g., the first photo sensor PHS1 of FIG. 3 or the second photo sensor PHS2 of FIG. 4) for sensing the user's fingerprint may be disposed in every pixel row PXR[1] to PXR[n] of the display area AA in order to increase a precision of the fingerprint sensing. On the other hand, the photo sensor (e.g., the second photo sensor PHS2 of FIG. 4) for sensing the user's touch may not be disposed in a portion (e.g., in some) of the pixel rows PXR[1] to PXR[n], and may be disposed in the pixel rows corresponding to (e.g., set as) the second row R2. Here, when sensing the user's touch, because the presence or absence of a touch occurrence may be detected, even though the photo sensor (e.g., the second photo sensor PHS2 of FIG. 4) for sensing the user's touch is disposed at (e.g., in or on) the second row R2, a suitable and desired touch sensing operation may be performed.

Referring again to FIG. 2, power voltages VDD, VSS, VRST, and VCOM used for driving the pixel PX and the photo sensor PHS may be provided to the display panel 100. The power voltages VDD, VSS, VRST, and VCOM may be provided from a power supply. For example, the power supply may be implemented as a power management integrated circuit (PMIC).

The driving circuit 200 may include the panel driver 210 and the sensor driver 220.

The driving circuit 200 may include a scan driver 211 (e.g., a gate driver), an emission driver 212, a data driver 213 (e.g., a source driver), a controller 214 (e.g., a timing controller), a reset circuit 221 (e.g., a reset unit), and a readout circuit 222 (e.g., a readout unit). For example, the scan driver 211, the emission driver 212, the data driver 213, and the controller 214 may be included in the panel driver 210, and the reset circuit 221 and the readout circuit 222 may be included in the sensor driver 220, but the present disclosure is not limited thereto. For example, the reset circuit 221 may be included in the panel driver 210.

The scan driver 211 may be electrically connected to the pixels PX and the photo sensors PHS through the first scan lines S11 to S1n (e.g., the scan lines). The scan driver 211 may generate the first scan signal (e.g., a scan signal) based on a scan control signal SCS (e.g., a gate control signal), and provide the first scan signal to the first scan lines S11 to S1n (e.g., the scan lines). Here, the scan control signal SCS may include a start signal, clock signals, and the like, and may be provided from the controller 214 to the scan driver 211. For example, the scan driver 211 may be implemented as a shift register that generates and outputs the first scan signal by sequentially shifting a start signal having a pulse shape using the clock signals. In other words, the scan driver 211 may selectively drive the pixel PX and the photo sensor PHS, while scanning the display panel 100.

The scan driver 211 may be formed together with the pixels PX on the display panel 100. However, the present disclosure is not limited thereto, and for example, the scan driver 211 may be implemented as an integrated circuit.

The pixel PX that is selectively driven by the scan driver 211 may emit light having the luminance corresponding to the data signal provided to the data line. In addition, the photo sensor PHS that is selectively driven by the scan driver 211 may output an electrical signal (e.g., a sensing signal, such as a current/voltage) corresponding to the sensed light to the readout line.

For example, the first pixel PX1 that is selectively driven through the first sub-scan line S1p shown in FIG. 3 may emit light having a luminance corresponding to the data signal provided to the data line Di. In addition, the first photo sensor PHS1 that is selectively driven through the first sub-scan line S1p shown in FIG. 3 may output an electrical signal corresponding to the sensed light to the readout line RXj.

As another example, the second pixel PX2 that is selectively driven through the second sub-scan line S1q shown in FIG. 4 may emit light having a luminance corresponding to the data signal provided to the data line Di. In addition, the second photo sensor PHS2 that is selectively driven through the second sub-scan line S1q shown in FIG. 4 may output an electrical signal corresponding to the sensed light to the readout line RXj.

The emission driver 212 may be electrically connected to the pixels PX through the emission control lines E1 to En. The emission driver 212 may generate the emission control signal based on an emission driving control signal ECS, and may provide the emission control signal to the emission control lines E1 to En. Here, the emission driving control signal ECS may include a start signal, clock signals, and the like, and may be provided from the controller 214 to the emission driver 212. For example, the emission driver 212 may be implemented as a shift register that generates and outputs the emission control signal by sequentially shifting a start signal having a pulse shape using the clock signals.

The emission driver 212 may be formed together with the pixels PX on the display panel 100. However, the present disclosure is not limited thereto, and for example, the emission driver 212 may be implemented as an integrated circuit.

When the emission control signal is supplied, the pixels PX receiving the emission control signal may not emit light. For example, the emission control signal may have (e.g., may be set to) a gate-off level (e.g., a high level), so that a transistor included in the pixels PX is turned off. The transistor included in the pixel PX and receiving the emission control signal may be turned off when the emission control signal is supplied, and may be turned-on (e.g., may be set to a turn-on state) in other cases.

For example, the first pixel PX1 connected to the first emission control line Ep of FIG. 3 may not emit light in response to a period in which the emission control signal is supplied to the first emission control line Ep.

As another example, the second pixel PX2 connected to the second emission control line Eq of FIG. 4 may not emit light in response to a period in which the emission control signal is supplied to the second emission control line Eq.

As described above, the emission control signal may be used to control an emission time of the pixels PX. For example, the emission control signal may have (e.g., may be set to have) a width wider than that of the scan signal (e.g., the first scan signal).

In an embodiment, the emission driver 212 may be electrically connected to at least a portion of the photo sensors PHS through the emission control lines E1 to En. For example, as described above with reference to FIG. 4, from among the photo sensors PHS, the second photo sensor PHS2 disposed in the second row R2 of the display area AA of the display panel 100 may be electrically connected to the emission driver 212 through the third emission control line Er to receive the emission control signal from the emission driver 212. Here, from among the photo sensors PHS, the photo sensor connected to the emission driver 212 (e.g., the second photo sensor PHS2 shown in FIG. 4) may be reset (e.g., may be initialized) by a reset voltage VRST, when the emission control signal is supplied from the emission control line (e.g., the third emission control line Er).

The data driver 213 may generate the data signal (e.g., a data voltage) based on image data DATA2 and a data control signal DCS provided from the controller 214, and may provide the data signal to the display panel 100 (e.g., to the pixels PX) through the data lines D1 to Dm. Here, the data control signal DCS may be a signal for controlling an operation of the data driver 213, and may include a data enable signal (e.g., a load signal) indicating an output of a valid data signal, a horizontal start signal, a data clock signal, and the like. For example, the data driver 213 may include a shift register for generating a sampling signal by shifting the horizontal start signal in synchronization with the data clock signal, a latch for latching the image data DATA2 in response to the sampling signal, a digital-to-analog converter (e.g., a decoder) for converting the latched image data (e.g., data of a digital format) into a data signal of an analog format, and a buffer (e.g., an amplifier) for outputting the data signal to the data lines D1 to Dm.

The controller 214 may receive input image data DATA1 and a control signal CS from an external device (e.g., a graphic processor, an application processor, or the like), may generate the scan control signal SCS, the emission driving control signal ECS, and the data control signal DCS based on the control signal CS, and may generate the image data DATA2 by converting the input image data DATA1. The control signal CS may include a vertical synchronization signal, a horizontal synchronization signal, a reference clock signal, and the like. The vertical synchronization signal may indicate a start of frame data (or in other words, data corresponding to a frame period in which one frame image is displayed), and the horizontal synchronization signal may indicate a start of a data row (or in other words, a start of one data row from among a plurality of data rows included in the frame data). For example, the controller 214 may convert the input image data DATA1 into the image data DATA2 having a format matching a pixel arrangement in the display panel 100.

In addition, the controller 214 may generate the reset control signal and the readout control signal RCS based on the control signal CS.

The reset circuit 221 may be commonly connected to at least a portion of the photo sensors PHS included in the display panel 100 through the reset control line (e.g., through one reset control line) RSTL. For example, as described above with reference to FIG. 3, the reset circuit 221 may be connected to the first photo sensor PHS1 disposed in the first row R1 from among the photo sensors PHS through the reset control line RSTL. The reset circuit 221 may concurrently (e.g., simultaneously or substantially simultaneously) provide a reset signal RST (e.g., the reset control signal) to at least the portion (e.g., the first photo sensor PHS1 of FIG. 3) of the photo sensors PHS in response to the reset control signal. Here, the reset signal RST may be a control signal for providing the reset voltage VRST to the photo sensor (e.g., the first photo sensor PHS1 of FIG. 3). When the reset voltage VRST is provided, the photo sensor (e.g., the first photo sensor PHS1 of FIG. 3) may be reset (e.g., may be initialized).

The other photo sensors PHS (e.g., the remaining photo sensors) may be connected to at least one of the emission control lines E1 to En, instead of the reset control line RSTL. For example, as described above with reference to FIG. 4, the second photo sensor PHS2 disposed in the second row R2 from among the photo sensors PHS may be connected to the third emission control line Er from among the emission control lines E1 to En, instead of the reset control line RSTL. In addition, when the emission control signal is provided to the photo sensor (e.g., the second photo sensor PHS2) through the emission control line (e.g., the third emission control line Er), the reset voltage VRST may be provided to the photo sensor (e.g., the second photo sensor PHS2), and thus, the photo sensor (e.g., the second photo sensor PHS2) may be reset (e.g., may be initialized).

In an embodiment, the emission driver 212 may vary a driving frequency of the emission control signal supplied to the emission control line (e.g., the third emission control line Er) connected to the second photo sensor PHS2 from among the emission control lines E1 to En. For example, when the display device 1000 is driven in the first mode, and the user's fingerprint is sensed based on a sensing signal output through the second photo sensor PHS2, the emission driver 212 may control (e.g., may vary) the driving frequency of the emission control signal supplied to the third emission control line Er to correspond to the fingerprint sensing frequency. For example, the emission driver 212 may control the driving frequency of the emission control signal supplied to the third emission control line Er to be less than a driving frequency of the emission control signal supplied to other emission control lines. For example, the driving frequency of the emission control signal supplied to the third emission control line Er through the emission driver 212 may be the same or substantially the same as (or similar to) that of the reset signal RST supplied to the reset control line RSTL through the reset circuit 221.

In addition, when the display device 1000 is driven in the second mode, and the user's touch is sensed based on the sensing signal output through the second photo sensor PHS2, the emission driver 212 may control (e.g., may vary) the driving frequency of the emission control signal supplied to the third emission control line Er to correspond to a touch driving frequency.

The readout circuit 222 may receive a sensing signal from the photo sensors PHS through the readout lines RX1 to RXo, and may perform signal processing on the sensing signal.

For example, the readout circuit 222 may perform a correlated double sampling (CDS) operation for removing or reducing noise from the sensing signal provided from the photo sensor PHS. The readout circuit 222 may perform the CDS operation in response to the readout control signal RCS. In other words, a timing of the CDS operation of the readout circuit 222 may be determined by the readout control signal RCS. In addition, the readout circuit 222 may convert a sensing signal of an analog format into a signal of a digital format (e.g., or a digital value). A configuration for the CDS and analog-to-digital conversion may be provided for each of the readout lines RX1 to RXo, and the readout circuit 222 may process the sensing signals, which are provided from the readout lines RX1 to RXo, in parallel.

The processed sensing signals, or in other words, the sensing signals that are read out, may be provided to an external device (e.g., an application processor) as sensing data (e.g., biometric information), and biometric authentication (e.g., user's fingerprint authentication) may be performed based on the sensing data. For example, the biometric authentication (e.g., the user's fingerprint authentication) may be performed based on the sensing signals read out from the photo sensors PHS (e.g., the first photo sensor PHS1 of FIG. 3 and the second photo sensor PHS2 of FIG. 4). As another example, the read out sensing signals may be provided to the controller 214, and the controller 214 may perform the biometric authentication.

In addition, the processed sensing signals, or in other words, the read out sensing signals, may be provided to an external device (e.g., an application processor) as sensing data (e.g., biometric information), and the user's touch may be sensed based on the sensing data. For example, the user's touch may be sensed based on the sensing signals read out from a portion (e.g., the second photo sensor PHS2 of FIG. 4) of the photo sensors PHS in the second mode of the display device 1000. As another example, the read out sensing signals may be provided to the controller 214, and the controller 214 may perform a user's touch sensing operation.

As described above with reference to FIGS. 1 to 5, the display device 1000 according to one or more embodiments of the present disclosure may sense the user's touch using the photo sensor PHS for sensing the user's fingerprint information, and thus, without including a separate touch panel (e.g., a separate touch sensor). Accordingly, the display device 1000 (e.g., the display panel 100) may be simplified.

When touch driving of the display device 1000 is performed, a touch driving frequency may be (e.g., may be set to be) the same or substantially the same as the driving frequency (e.g., the frame frequency) of the display device 1000, or may be greater than the driving frequency (e.g., the frame frequency) of the display device 1000. For example, when the user's touch is sensed, because information corresponding to the sensed touch may not be reflected in a displayed image, the touch driving frequency may be (e.g., may be set to be) the same or substantially the same as the driving frequency (e.g., the frame frequency) of the display device 1000.

On the other hand, when fingerprint sensing driving of the display device 1000 is performed, the fingerprint sensing frequency may be (e.g., may be set to be) less than the driving frequency (e.g., the frame frequency) of the display device 1000. For example, in the fingerprint sensing driving, in order to more precisely measure (e.g., generate) a detection value corresponding to light reflected by a user (e.g., a user's finger) for fingerprint sensing (or in other words, in order to increase a precision in sensing the fingerprint information), the fingerprint sensing frequency may be (e.g., may be set to be) less than the driving frequency (e.g., the frame frequency) of the display device 1000 to sufficiently secure a reset time.

Here, in order to control a reset operation of the second photo sensor PHS2 (e.g., in order for the reset voltage VRST to be provided to the second photo sensor PHS2 to reset the second photo sensor PHS2), according to an embodiment, because the emission control line (e.g., the third emission control line Er) is connected to the second photo sensor PHS2, instead of the reset control line RSTL, the display device 1000 according to one or more embodiments of the present disclosure may perform both of the user's fingerprint sensing operation and the user's touch sensing operation through the second photo sensor PHS2 by varying the driving frequency of the second photo sensor PHS2 according to a mode (e.g., the first mode or the second mode). For example, the display device 1000 according to one or more embodiments of the present disclosure may control the frequency (e.g., the driving frequency of the emission control signal supplied to the third emission control line Er) for driving the second photo sensor PHS2 to correspond to the fingerprint sensing frequency in the first mode for sensing the user's fingerprint, and may control the frequency (e.g., the driving frequency of the emission control signal supplied to the third emission control line Er) for driving the second photo sensor PHS2 to correspond to the touch driving frequency (e.g., the touch driving frequency that is the same or substantially the same as the frame frequency of the display device 1000). Accordingly, the display device 1000 according to one or more embodiments of the present disclosure may sense the touch concurrently (e.g., simultaneously or substantially simultaneously) with sensing the fingerprint information, by receiving reflected light or the like through the photo sensor PHS (e.g., the second photo sensor PHS2).

Figure 6:
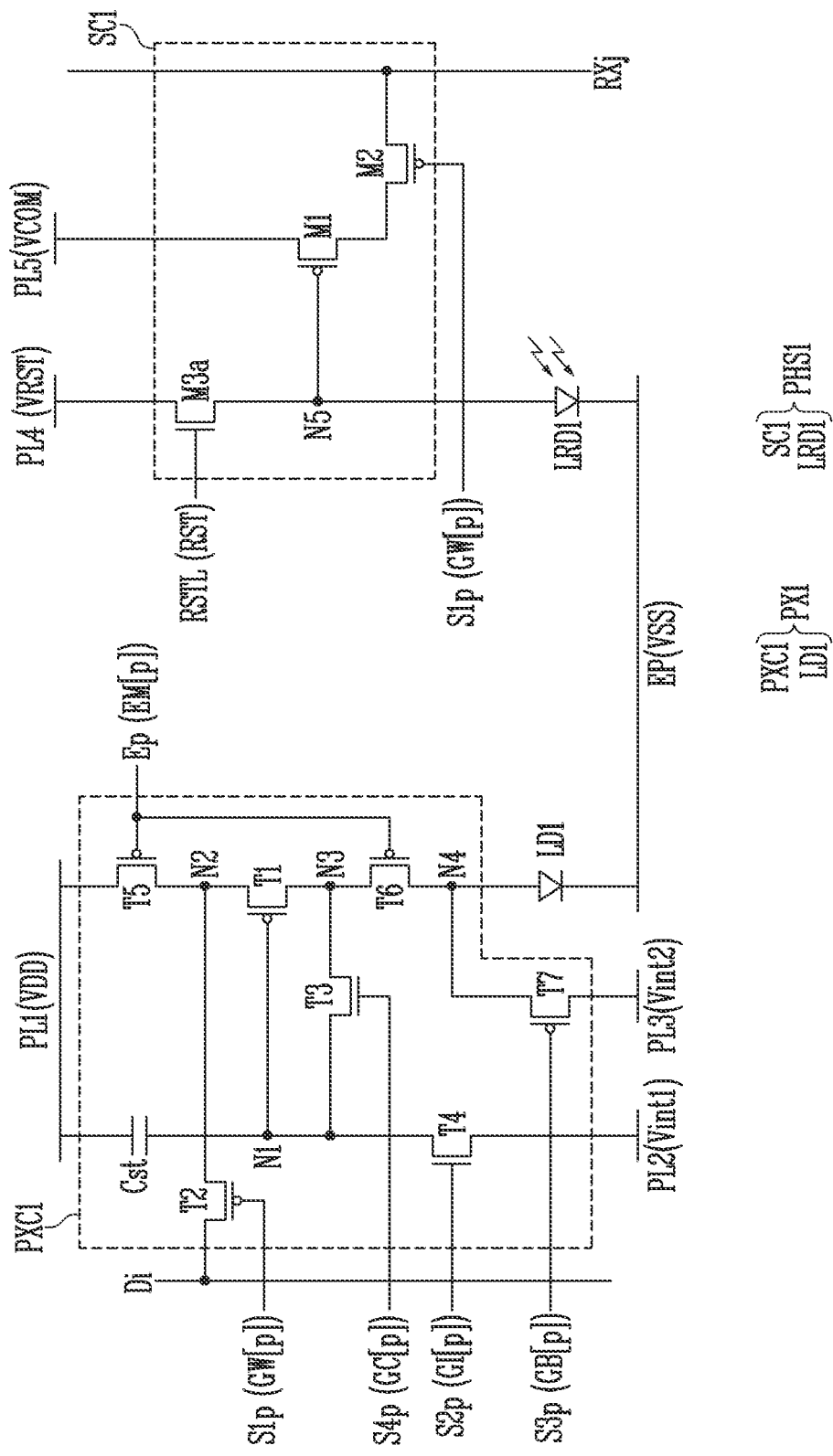
FIG. 6 is an equivalent circuit diagram of an example of the first pixel and the first photo sensor of FIG. 3.

FIG. 6 is an equivalent circuit diagram of an example of the first pixel and the first photo sensor of FIG. 3. For example, in FIG. 6, the first pixel PX1 positioned in the first row (e.g., the p-th pixel row, or a p-th horizontal line) and connected to the i-th data line Di (hereinafter, referred to as a data line) is shown.

Referring to FIGS. 1, 2, 3, 5, and 6, the first pixel PX1 and the first photo sensor PHS1 may be disposed in the first row R1 (e.g., the p-th horizontal line).

The first pixel PX1 may include a first light emitting element LD1 and a first pixel circuit PXC1. In an embodiment, the first pixel circuit PXC1 may include first to seventh pixel transistors T1 to T7, and a storage capacitor Cst.

The first pixel transistor T1 (e.g., a driving transistor) may be connected between a first power line PL1 and a first electrode of the first light emitting element LD1. The first pixel transistor T1 may include a gate electrode connected to a first node N1. The first pixel transistor T1 may control a current amount (e.g., a driving current) flowing from the first power line PL1 to an electrode EP (e.g., a power line) through the first light emitting element LD1, based on a voltage of the first node N1. A first power voltage VDD may be provided to the first power line PL1, and a second power voltage VSS may be provided to the electrode EP. For example, the first power voltage VDD may be (e.g., may be set to be) higher than the second power voltage VSS. For example, the first power voltage VDD may be about 4.6V, and the second power voltage VSS may be about −2.6V.

The second pixel transistor T2 may be connected between the data line Di and a second node N2. A gate electrode of the second pixel transistor T2 may be connected to the p-th first scan line S1p (hereinafter, referred to as a first sub-scan line). The second pixel transistor T2 may be turned on when a first scan signal GW[p] (e.g., of a low level) is supplied to the first sub-scan line S1p, to electrically connect the data line Di and the second node N2 to each other.

The third pixel transistor T3 may be connected between the first node N1 and a third node N3. A gate electrode of the third pixel transistor T3 may be connected to a p-th fourth scan line S4p. The third pixel transistor T3 may be turned on when a fourth scan signal GC[p] (e.g., of a high level) is supplied to the p-th fourth scan line S4$p$. When the third pixel transistor T3 is turned on, the first pixel transistor T1 may be diode-connected.

The fourth pixel transistor T4 may be connected between the first node N1 and the second power line PL2. A gate electrode of the fourth pixel transistor T4 may be connected to a p-th second scan line S2$p$. A first initialization power voltage Vint1 may be provided from the second power line PL2. For example, the first initialization power voltage Vint1 may have a negative voltage. As an example, the first initialization power voltage Vint1 may be about −3.8V. The fourth pixel transistor T4 may be turned on by a second scan signal GI[p] (e.g., of a high level) supplied to the p-th second scan line S2$p$. When the fourth pixel transistor T4 is turned on, the first initialization power voltage Vint1 may be supplied to the first node N1 (or in other words, to the gate electrode of the first pixel transistor T1).

The fifth pixel transistor T5 may be connected between the first power line PL1 and the second node N2. A gate electrode of the fifth pixel transistor T5 may be connected to the p-th emission control line Ep (hereinafter, referred to as a first emission control line).

The sixth pixel transistor T6 may be connected between the third node N3 and the first light emitting element LD1 (e.g., at a fourth node N4). A gate electrode of the sixth pixel transistor T6 may be connected to the first emission control line Ep.

The fifth pixel transistor T5 and the sixth pixel transistor T6 may be turned off when an emission control signal EM[p] (e.g., of a high level) is supplied to the first emission control line Ep, and may be turned on in other cases.

The seventh pixel transistor T7 may be connected between the first electrode (e.g., the fourth node N4) of the first light emitting element LD1 and a third power line PL3. A gate electrode of the seventh pixel transistor T7 may be connected to a p-th third scan line S3$p$. A second initialization power voltage Vint2 may be provided from the third power line PL3. For example, the second initialization power voltage Vint2 may have a negative voltage. For example, the second initialization power voltage Vint2 may be about −3.8V. According to an embodiment, the second initialization power voltage Vint2 may have a voltage level that is different from that of the first initialization power voltage Vint1. The seventh pixel transistor T7 may be turned on by a third scan signal GB[p] (e.g., of a low level) supplied to the p-th third scan line S3$p$, to supply the second initialization power voltage Vint2 to the first electrode of the first light emitting element LD1.

The storage capacitor Cst may be connected between the first power line PL1 and the first node N1.

The first photo sensor PHS1 may include a first light receiving element LRD1 and a first sensor circuit SC1. In an embodiment, the first sensor circuit SC1 may include first to third sensor transistors M1, M2, and M3$a$.

The first and second sensor transistors M1 and M2 may be connected in series between a fifth power line PL5 and the j-th readout line RXj (hereinafter, referred to as a readout line).

The first sensor transistor M1 (e.g., a first sub-sensor transistor) may be connected between the fifth power line PL5 and the second sensor transistor M2. A gate electrode of the first sensor transistor M1 may be connected to a fifth node N5 (e.g., a sensor node). A common voltage VCOM may be provided from the fifth power line PL5. For example, the common voltage VCOM may have a negative voltage. For example, the common voltage VCOM may be about −3.8V. According to an embodiment, the fifth power line PL5 may be electrically connected to, or integrally formed with, the second power line PL2 or the third power line PL3, and the common voltage VCOM applied from the fifth power line PL5 may be the same or substantially the same as the first initialization power voltage Vint1 or the second initialization power voltage Vint2, but the present disclosure is not limited thereto.

The second sensor transistor M2 (e.g., a second sub-sensor transistor) may be connected between the first sensor transistor M1 and the readout line RXj. A gate electrode of the second sensor transistor M2 may be connected to the first sub-scan line S1$p$. In other words, the gate electrode of the second sensor transistor M2 and the gate electrode of the second pixel transistor T2 may share (or may be electrically connected to) the same first sub-scan line S1$p$.

The third sensor transistor M3$a$ (e.g., a third sub-sensor transistor) may be connected between a fourth power line PL4 (e.g., a reference power line) and the fifth node N5. A gate electrode of the third sensor transistor M3$a$ may be connected to the reset control line RSTL. The reset voltage VRST may be provided from the fourth power line PL4. For example, the reset voltage VRST may have a negative voltage. For example, the reset voltage VRST may be about −7V.

At least one first light receiving element LRD1 may be connected between the fifth node N5 and the electrode EP to which the second power voltage VSS is provided.

The first light receiving element LRD1 may generate a charge (e.g., a current) based on incident light. In other words, the first light receiving element LRD1 may perform a photoelectric conversion function. For example, the first light receiving element LRD1 may be implemented as a photodiode.

When the third sensor transistor M3$a$ is turned on by the reset signal RST supplied to the reset control line RSTL, the reset voltage VRST may be provided to the fifth node N5. For example, a voltage of the fifth node N5 may be reset by the reset voltage VRST. After the reset voltage VRST is applied to the fifth node N5, the first light receiving element LRD1 may perform the photoelectric conversion function.

The voltage of the fifth node N5 may be changed by an operation of the first light receiving element LRD1. The voltage of the fifth node N5 (or the charge or current generated in the first light receiving element LRD1) may be changed according to an intensity of the light incident on the first light receiving element LRD1, and a light incident time (e.g., a time when the first light receiving element LRD1 is exposed to light).

When the second sensor transistor M2 is turned on by the first scan signal GW[p] supplied to the first sub-scan line S1$p$, a detection value (e.g., a current and/or a voltage) generated based on the voltage of the fifth node N5 may flow to the readout line RXj.

In an embodiment, each of the first pixel circuit PXC1 and the first sensor circuit SC1 may include a P-type transistor and an N-type transistor. In an embodiment, the third pixel transistor T3, the fourth pixel transistor T4, and the third sensor transistor M3$a$ may be formed of an oxide semiconductor transistor. For example, the third pixel transistor T3, the fourth pixel transistor T4, and the third sensor transistor M3$a$ may be an N-type oxide semiconductor transistor, and may include an oxide semiconductor layer as an active layer.

The oxide semiconductor transistor may be processed at a low temperature, and has a low charge mobility compared to a polysilicon semiconductor transistor. In other words, the oxide semiconductor transistor has excellent off current characteristics. Therefore, a leakage current in the third pixel transistor T3, the fourth pixel transistor T4, and the third sensor transistor M3a may be reduced, minimized, or prevented.

The other remaining transistors may be formed of polysilicon transistors, and may include a polysilicon semiconductor layer as an active layer. For example, the active layer may be formed through a low-temperature polycrystalline-silicon (LTPS) process. For example, the polysilicon transistor may be a P-type polysilicon transistor. Because the polysilicon semiconductor transistor may have fast response speeds, the polysilicon semiconductor transistor may be applied to a switching element used for fast switching.

As described above, the first pixel circuit PXC1 and the first sensor circuit SC1 may share a scan line (e.g., the first sub-scan line S1p), and the first pixel circuit PXC1 and the first sensor circuit SC1 may be scanned concurrently (e.g., simultaneously or substantially simultaneously) with each other. In this case, the number of lines disposed on the display panel 100 (e.g., refer to FIG. 1) may be relatively reduced, and a resolution degradation due to the lines (e.g., due to relatively many lines) may be alleviated. In addition, a driver (e.g., the scan driver 211) for driving the first pixel PX1 and the first photo sensor PHS1 may be integrated (e.g., may be the same driver), and thus, a space for the driver may be reduced.

Figure 7:
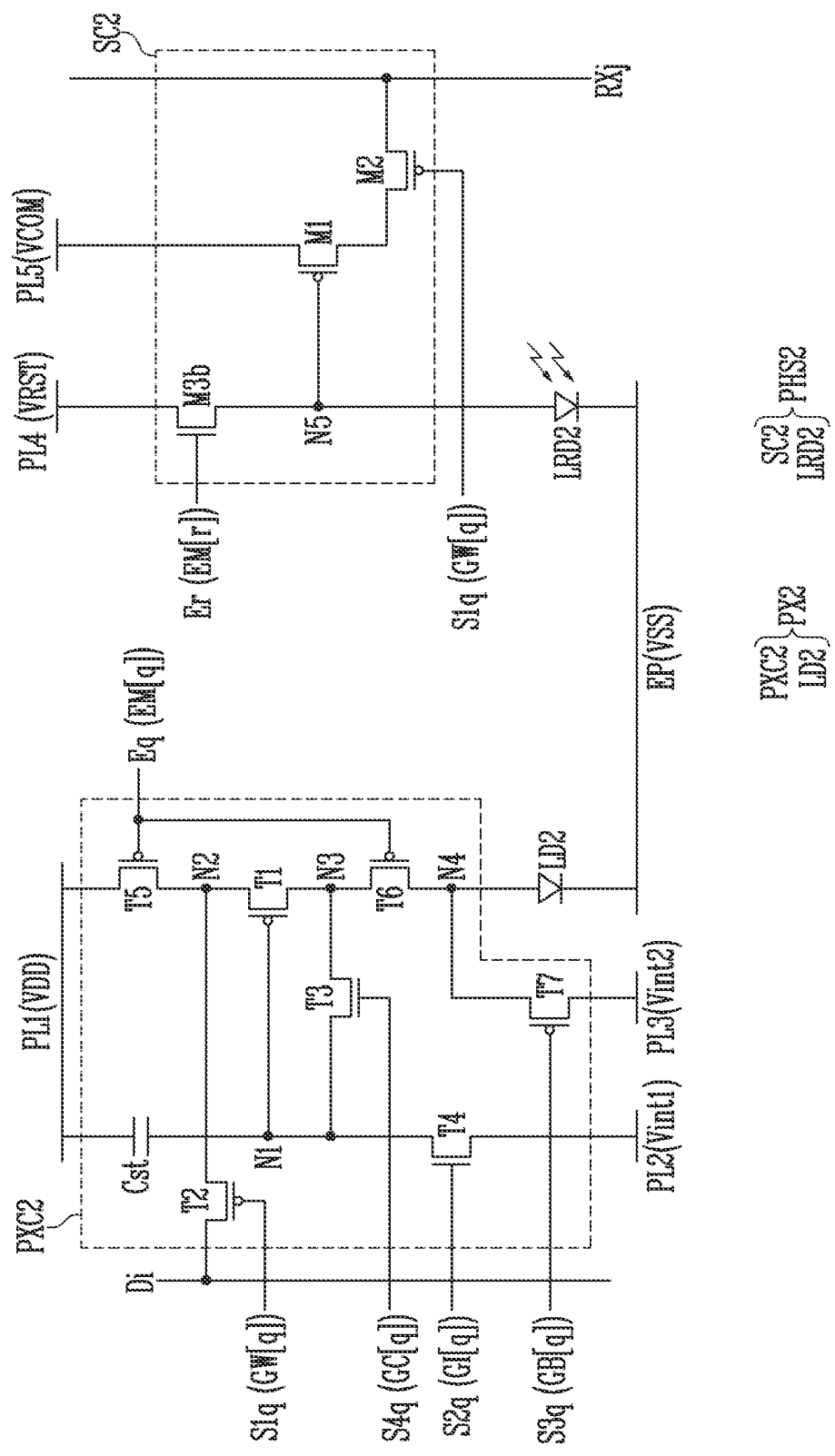
FIG. 7 is an equivalent circuit diagram of an example of the second pixel and the second photo sensor of FIG. 4.

FIG. 7 is an equivalent circuit diagram of an example of the second pixel and the second photo sensor of FIG. 4. For example, in FIG. 7, the second pixel PX2 positioned in the second row (e.g., a q-th pixel row, or a q-th horizontal line) and connected to the i-th data line Di (hereinafter, referred to as data line) is shown.

In FIG. 7, the same or substantially the same components as those described above with reference to FIG. 6 are denoted with the same reference symbols, and similar components as those described above with reference to FIG. 6 are denoted with similar reference symbols. Thus, redundant description thereof may not be repeated, and the differences between the embodiments shown in FIGS. 6 and 7 may be mainly described in more detail hereinafter.

Referring to FIGS. 1, 2, 4, 5, and 7, the second pixel PX2 and the second photo sensor PHS2 may be disposed in the second row R2 (e.g., the q-th horizontal line).

The second pixel PX2 and the second photo sensor PHS2 shown in FIG. 7 may be the same or substantially the same as (or similar to) the first pixel PX1 and the first photo sensor PHS1 described above with reference to FIG. 6, except that the second pixel PX2 and the second photo sensor PHS2 of FIG. 7 are disposed in the second row R2, and connected to corresponding signal lines. Further, the gate electrode of the third sensor transistor M3b of the second photo sensor PHS2 is connected to the r-th emission control line Er (hereinafter, referred to as the third emission control line). Thus, redundant description thereof may not be repeated.

The second pixel PX2 may include a second light emitting element LD2 and a second pixel circuit PXC2. In an embodiment, the second pixel circuit PXC2 may include first to seventh pixel transistors T1 to T7, and a storage capacitor Cst.

The second pixel circuit PXC2 and the second light emitting element LD2 included in the second pixel PX2 of FIG. 7 are the same or substantially the same as (or similar to) the first pixel circuit PXC1 and the first light emitting element LD1 included in the first pixel PX1 described above with reference to FIG. 6, except that the second pixel circuit PXC2 included in the second pixel PX2 is connected to the q-th first scan line S1q (hereinafter, referred to as the second sub-scan line) to which the first scan signal GW[q] is supplied, the q-th second scan line S2q to which the second scan signal GI[q] is supplied, a q-th third scan line S3q to which a third scan signal GB[q] is supplied, a q-th fourth scan line S4q to which a fourth scan signal GC[q] is supplied, and the q-th emission control line Eq (hereinafter, referred to as the second emission control line) to which an emission control signal EM[q] is supplied.

The second photo sensor PHS2 may include a second light receiving element LRD2 and a second sensor circuit SC2. In an embodiment, the second sensor circuit SC2 may include a first sensor transistor M1 (e.g., a fourth sub-sensor transistor), a second sensor transistor M2 (e.g., a fifth sub-sensor transistor), and a third sensor transistor M3b (e.g., a sixth sub-sensor transistor).

The second sensor circuit SC2 and the second light receiving element LRD2 included in the second photo sensor PHS2 of FIG. 7 are the same or substantially the same as (or similar to) the first sensor circuit SC1 and the first light receiving element LRD1 included in the first photo sensor PHS1 described above with reference to FIG. 6, except that the gate electrode of the second sensor transistor M2 included in the second sensor circuit SC2 of the second photo sensor PHS2 is connected to the q-th first scan line S1q (hereinafter, referred to as the second sub-scan line) to which the first scan signal GW[q] is supplied, and the gate electrode of the third sensor transistor M3b is connected to the r-th emission control line Er (hereinafter, referred to as the third emission control line) to which the emission control signal EM[r] is supplied.

The third sensor transistor M3b may be connected between the fourth power line PL4 (e.g., the reference power line) and the fifth node N5. The gate electrode of the third sensor transistor M3b may be connected to the third emission control line Er.

When the third sensor transistor M3b is turned on in response to the emission control signal EM[r] supplied to the third emission control line Er, the reset voltage VRST may be provided to the fifth node N5. For example, the voltage of the fifth node N5 may be reset by the reset voltage VRST.

Figure 8:
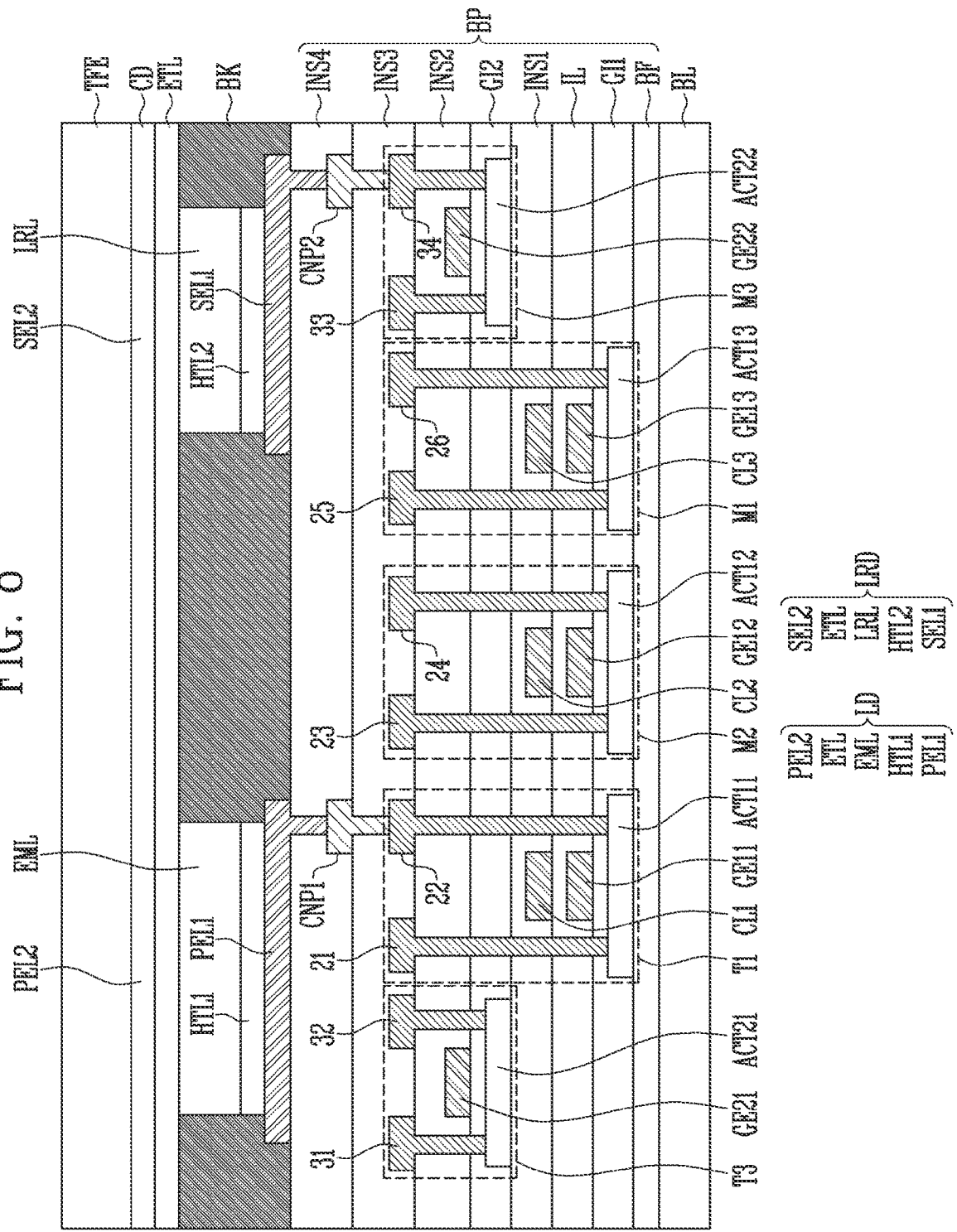
FIG. 8 is an enlarged cross-sectional view of a portion of the display panel included in the display device of FIG. 2.

FIG. 8 is an enlarged cross-sectional view of a portion of the display panel included in the display device of FIG. 2.

Referring to FIGS. 1 to 8, the pixel transistors T1 to T7 and the sensor transistors M1, M2, and M3 may be included in a backplane structure BP (e.g., a circuit layer) of the display panel 100.

For convenience of illustration, FIG. 8 shows the first pixel transistor T1, the third pixel transistor T3, the first sensor transistor M1, the second sensor transistor M2, and the third sensor transistor M3 (e.g., the third sensor transistor M3a of FIG. 6 or the third sensor transistor M3b of FIG. 7).

The base layer BL may be formed of an insulating material, such as glass or resin. In addition, the base layer BL may be formed of a suitable material having flexibility to be bent or folded, and may have a single-layer structure or a multi-layered structure.

The backplane structure BP may include a pixel circuit (e.g., the first pixel circuit PXC1 of FIG. 6 and/or the second pixel circuit PXC2 of FIG. 7), and a sensor circuit (e.g., the first sensor circuit SC1 of FIG. 6 and/or the second sensor circuit SC2 of FIG. 7), which may be provided on the base layer BL. The backplane structure BP may include a semiconductor layer, a plurality of conductive layers, and a plurality of insulating layers, which will be described in more detail below.

A buffer layer BF may be formed on the base layer BL. The buffer layer BF may prevent or substantially prevent an impurity from diffusing into a pixel transistor (e.g., the first to seventh pixel transistors T1 to T7) and a sensor transistor (e.g., the first to third sensor transistors M1, M2, and M3). The buffer layer BF may be omitted as needed or desired, for example, according to a material and/or a process condition of the base layer BL.

First to third active patterns ACT11, ACT12, and ACT13 may be provided on the buffer layer BF. In an embodiment, the first to third active patterns ACT11, ACT12, and ACT13 may be formed of a polysilicon semiconductor. For example, the first to third active patterns ACT11, ACT12, and ACT13 may be formed through a low-temperature polysilicon process (e.g., a low-temperature poly-silicon (LTPS) process).

A first gate insulating layer GI1 may be provided on the first to third active patterns ACT11, ACT12, and ACT13. The first gate insulating layer GI1 may be an inorganic insulating layer formed of an inorganic material.

First to third gate electrodes GE11, GE12, and GE13 may be provided on the first gate insulating layer GI1. The first gate electrode GE11 may overlap with a channel area of the first active pattern ACT11. The second gate electrode GE12 may overlap with a channel area of the second active pattern ACT12. The third gate electrode GE13 may overlap with a channel area of the third active pattern ACT13.

The first to third gate electrodes GE11, GE12, and GE13 may be formed of a metal. For example, the first to third gate electrodes GE11, GE12, and GE13 may be formed of at least one of various suitable metals, such as gold (Au), silver (Ag), aluminum (Al), molybdenum (Mo), chromium (Cr), titanium (Ti), nickel (Ni), neodymium (Nd), and/or copper (Cu), or a suitable alloy of the metals. In addition, the first to third gate electrodes GE11, GE12, and GE13 may be formed as a single layer, or multiple layers in which two or more materials from among the above metals and alloys are stacked.

An interlayer insulating layer IL may be provided on the first to third gate electrodes GE11, GE12, and GE13. The interlayer insulating layer IL may be an inorganic insulating layer formed of an inorganic material. As the inorganic material, polysiloxane, silicon nitride, silicon oxide, silicon oxynitride, or the like may be used.

Conductive patterns CL1, CL2, and CL3 may be provided on the interlayer insulating layer IL. The conductive patterns CL1, CL2, and CL3 may form at least one of an electrode of the storage capacitor Cst, the scan lines (e.g., the scan lines S1p to S4p of FIG. 6 or the scan lines S1q to S4q of FIG. 7), the reset control line RSTL, the data line Di, the readout line RXj, and the power lines PL1 to PL4.

The conductive patterns CL1, CL2, and CL3 may be formed of at least one of various suitable metals, such as gold (Au), silver (Ag), aluminum (Al), molybdenum (Mo), chromium (Cr), titanium (Ti), nickel (Ni), neodymium (Nd), and/or copper (Cu), or a suitable alloy of the above metals. In addition, the conductive patterns CL1, CL2, and CL3 may be formed as a single layer, but are not limited thereto, and the conductive patterns CL1, CL2, and CL3 may be formed as multiple layers in which two or more materials from among the above metals and alloys are stacked.

A first insulating layer INS1 may be provided on the conductive patterns CL1, CL2, and CL3. The first insulating layer INS1 may be an inorganic insulating layer formed of an inorganic material. As the inorganic material, polysiloxane, silicon nitride, silicon oxide, silicon oxynitride, or the like may be used.

A fourth active pattern ACT21 and a fifth active pattern ACT22 may be provided on the first insulating layer INS1. In an embodiment, the fourth and fifth active patterns ACT21 and ACT22 may be formed of an oxide semiconductor. For example, the fourth and fifth active patterns ACT21 and ACT22 may be formed through a metal oxide semiconductor forming process.

A second gate insulating layer GI2 may be provided on the fourth active pattern ACT21 and the fifth active pattern ACT22. The second gate insulating layer GI2 may be an inorganic insulating layer formed of an inorganic material.

Fourth and fifth gate electrodes GE21 and GE22 may be provided on the second gate insulating layer GI2. The fourth gate electrode GE21 may overlap with a channel area of the fourth active pattern ACT21, and the fifth gate electrode GE22 may overlap with a channel area of the fifth active pattern ACT22.

A second insulating layer INS2 may be provided on the fourth and fifth gate electrodes GE21 and GE22. For example, the second insulating layer INS2 may be an inorganic insulating layer formed of an inorganic material.

On the second insulating layer INS2, first source/drain electrodes 21 and 22, second source/drain electrodes 23 and 24, third source/drain electrodes 25 and 26, fourth source/drain electrodes 31 and 32, and fifth source/drain electrodes 33, 34 may be provided. The first to fifth source/drain electrodes 21, 22, 23, 24, 25, 26, 31, 32, 33, and 34 may be connected to the first to fifth active patterns ACT11, ACT12, ACT13, AC21, and ACT22 corresponding thereto through contact holes, respectively.

The first to fifth source/drain electrodes 21, 22, 23, 24, 25, 26, 31, 32, 33, and 34 may be formed of a metal.

A third insulating layer INS3 may be provided on the first to fifth source/drain electrodes 21, 22, 23, 24, 25, 26, 31, 32, 33, and 34. For example, the third insulating layer INS3 may be an inorganic insulating layer formed of an inorganic material.

Connection patterns CNP1 and CNP2 may be provided on the third insulating layer INS3. A first connection pattern CNP1 may be connected to the first drain electrode 22 through a contact hole passing through (e.g., penetrating) the third insulating layer INS3. A second connection pattern CNP2 may be connected to the fifth drain electrode 34 (or the fifth source electrode) through a contact hole passing through (e.g., penetrating) the third insulating layer INS3.

The connection patterns CNP1 and CNP2 may be formed of at least one of various suitable metals, such as gold (Au), silver (Ag), aluminum (Al), molybdenum (Mo), chromium (Cr), titanium (Ti), nickel (Ni), neodymium (Nd), and/or copper (Cu), or a suitable alloy of the metals.

A fourth insulating layer INS4 may be disposed on the connection patterns CNP1 and CNP2. The fourth insulating layer INS4 may be an organic insulating layer formed of an organic material, or an inorganic insulating layer formed of an inorganic material. In an embodiment, the fourth insulating layer INS4 may serve as a planarization layer.

A pixel layer including a first pixel electrode PEL1, a first sensor electrode SEL1, and a bank layer BK may be provided on the fourth insulating layer INS4.

The pixel layer may include a light emitting element LD (e.g., the first light emitting element LD1 of FIG. 6 and/or the second light emitting element LD2 of FIG. 7) connected to the pixel circuit (e.g., the first pixel circuit PXC1 of FIG. 6 and/or the second pixel circuit PXC2 of FIG. 7), and a light receiving element LRD (e.g., the first light receiving element LRD1 of FIG. 6 and/or the second light receiving element LRD2 of FIG. 7) connected to the sensor circuit (e.g., the first sensor circuit SC1 of FIG. 6 and/or the second sensor circuit SC2 of FIG. 7).

In an embodiment, the light emitting element LD may include the first pixel electrode PEL1, a first hole transport layer HTL1, a light emitting layer EML, an electron transport layer ETL, and a second pixel electrode PEL2. In an embodiment, the light receiving element LRD may include the first sensor electrode SEL1, a second hole transport layer HTL2, a light receiving layer LRL, an electron transport layer ETL, and a second sensor electrode SEL2.

In an embodiment, the first pixel electrode PEL1 and the first sensor electrode SEL1 may be formed of a metal layer including one or more of Ag, Mg, Al, Pt, Pd, Au, Ni, Nd, Ir, Cr, a suitable alloy thereof, or the like, indium tin oxide (ITO), indium zinc oxide (IZO), zinc oxide (ZnO), indium tin zinc oxide (ITZO), and/or the like. The first pixel electrode PEL1 may be connected to the first drain electrode 22 through a contact hole. The first sensor electrode SEL1 may be connected to the fifth drain electrode 34 through a contact hole.

The first pixel electrode PEL1 and the first sensor electrode SEL1 may be concurrently (e.g., simultaneously or substantially simultaneously) formed through patterning using a mask.

The bank layer BK (e.g., a pixel defining layer) that partitions a light emitting area and a light receiving area may be provided on the fourth insulating layer INS4 on which the first pixel electrode PEL1 and the first sensor electrode SEL1 are formed. The bank layer BK may be an organic insulating layer formed of an organic material. The organic material may include an acrylic resin, an epoxy resin, a phenolic resin, a polyamide resin, a polyimide resin, and/or the like.

In addition, the bank layer BK may include a light absorbing material, or a light absorber may be applied to the bank layer BK, and thus, the bank layer BK may serve to absorb light input from the outside. For example, the bank layer BK may include a carbon-based black pigment. However, the present disclosure is not limited thereto, and the bank layer BK may include an opaque metal material, such as chromium (Cr), molybdenum (Mo), a suitable alloy of molybdenum and titanium (MoTi), tungsten (W), vanadium (V), niobium (Nb), tantalum (Ta), manganese (Mn), cobalt. (Co), or nickel (Ni) having high light absorption.

The bank layer BK may include openings corresponding to the light emitting area and the light receiving area.

The first hole transport layer HTL1 may be provided on an upper surface of the first pixel electrode PEL1 exposed by the bank layer BK, and the second hole transport layer HTL2 may be provided on an upper surface of the exposed first sensor electrode SEL1. A hole may move to the light emitting layer EML through the first hole transport layer HTL1, and a hole may move to the light receiving layer LRL through the second hole transport layer HTL2.

In an embodiment, the first hole transport layer HTL1 and the second hole transport layer HTL2 may be the same or substantially the same as each other, or may be different from each other according to a material of the light emitting layer EML and the light receiving layer LRL.

The light emitting layer EML may be provided on the first hole transport layer HTL1. In an embodiment, the light emitting layer EML may be formed of an organic light emitting layer. According to an organic material included in the light emitting layer EML, the light emitting layer EML may emit a suitable or desired color of light, such as red light, green light, or blue light.

In an embodiment, an electron blocking layer may be provided on the second hole transport layer HTL2 at (e.g., in or on) the light receiving area. The electron blocking layer may prevent or substantially prevent a charge of the light receiving layer LRL from being moved to the hole transport layer HTL. In an embodiment, the electron blocking layer may be omitted as needed or desired.

The light receiving layer LRL may be disposed on the second hole transport layer HTL2. The light receiving layer LRL may sense an intensity of light by emitting an electron in response to light of a suitable wavelength band (e.g., a predetermined or specific wavelength band).

In an embodiment, the light receiving layer LRL may include a low molecular organic material. For example, the light receiving layer LRL may be formed of a phthalocyanines compound containing at least one metal selected from a group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn).

In another embodiment, the low molecular organic material included in the light receiving layer LRL may be configured as a bi-layer including a layer including a phthalocyanines compound containing at least one metal selected from a group consisting of copper (Cu), iron (Fe), nickel (Ni), cobalt (Co), manganese (Mn), aluminum (Al), palladium (Pd), tin (Sn), indium (In), lead (Pb), titanium (Ti), rubidium (Rb), vanadium (V), gallium (Ga), terbium (Tb), cerium (Ce), lanthanum (La), and zinc (Zn), and a layer including C60, or may be configured as a single mixing layer in which a phthalocyanines compound and C60 are mixed with each other.

However, the present disclosure is not limited thereto, and the light receiving layer LRL may include a polymer organic layer.

In an embodiment, the light receiving layer LRL may determine a light detection band of the photo sensor by controlling a selection of a metal component included in the phthalocyanines compound. For example, a phthalocyanines compound containing copper absorbs a visible light wavelength of about 600 to 800, and a phthalocyanines compound containing tin (Sn) absorbs a near infrared wavelength of about 800 to 1000 nm. Therefore, by controlling the selection of the metal included in the phthalocyanines compound, a photo sensor capable of detecting a wavelength of a band desired by a user may be implemented. For example, the light receiving layer LRL may be formed to selectively absorb a wavelength of a red light band, a wavelength of a green light band, or a wavelength of a blue light band based on the material included in the light receiving layer LRL.

In an embodiment, the area of the light receiving area may be less than the area of the light emitting area.

The second pixel electrode PEL2 and the second sensor electrode SEL2 may be provided on the electron transport layer ETL. In an embodiment, the second pixel electrode PEL2 and the second sensor electrode SEL2 may be a common electrode CD that is integrally formed at (e.g., in or on) the display area AA. The second power voltage VSS may be supplied to the second pixel electrode PEL2 and the second sensor electrode SEL2.

The common electrode CD may be formed of a metal layer including one or more of Ag, Mg, Al, Pt, Pd, Au, Ni, Nd, Ir, or Cr, and/or a transparent conductive layer including one or more of ITO, IZO, ZnO, or ITZO. In an embodiment, the common electrode CD may be formed as multiple layers of double or more layers including a thin metal layer, for example, such as a triple layer of ITO/Ag/ITO.

An encapsulation layer TFE may be provided on the common electrode CD including the second pixel electrode PEL2 and the second sensor electrode SEL2. The encapsulation layer TFE may be formed as a single layer, but the present disclosure is not limited thereto, and the encapsulation layer TFE may be formed as multiple layers. In an embodiment, the encapsulation layer TFE may have a stacked structure, in which an inorganic material, an organic material, and an inorganic material are sequentially deposited. An uppermost layer of the encapsulation layer TFE may be formed of an inorganic material.

Figure 9:
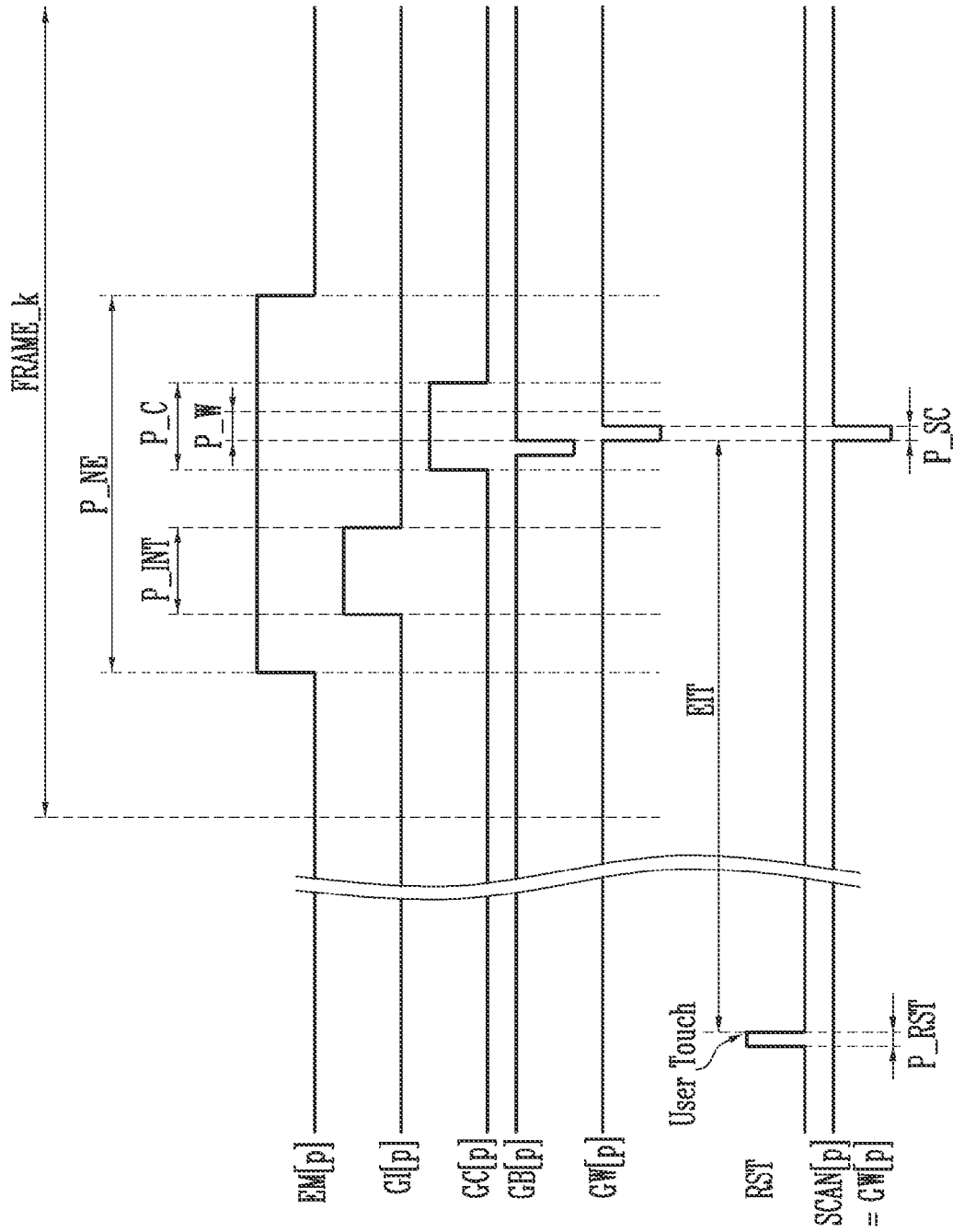
FIG. 9 is a waveform diagram illustrating an example of an operation of the first pixel and the first photo sensor of FIG. 6.

FIG. 9 is a waveform diagram illustrating an example of an operation of the first pixel and the first photo sensor of FIG. 6. In FIG. 9, an operation of the pixel and the photo sensor disposed in the first row (e.g., the first row R1 of FIG. 3) of the display area (e.g., the display area AA of FIG. 2) is illustrated.

Referring to FIGS. 1, 2, 3, 6, and 9, the emission control signal EM[p] may be provided to the p-th emission control line Ep (e.g., the first emission control line Ep), the second scan signal GI[p] may be provided to the p-th second scan line S2p, the fourth scan signal GC[p] may be provided to the p-th fourth scan line S4p, the third scan signal GB[p] may be provided to the p-th third scan line S3p, and the first scan signal GW[p] may be provided to the p-th first scan line S1p (e.g., the first sub-scan line S1p). The reset signal RST may be provided to the reset control line RSTL. A sensing signal SCAN[p] (e.g., a p-th sensing signal) may refer to a signal provided to the gate electrode of the second sensor transistor M2. Because the gate electrode of the second sensor transistor M2 may be connected to the first sub-scan line S1p, the sensing signal SCAN[p] may be the first scan signal GW[p].

A k-th frame period FRAME_k may include a non-emission period P_NE. The non-emission period P_NE (e.g., of the k-th frame period FRAME_k) may include an initialization period P_INT, a compensation period P_C, and a write period P_W. The write period P_W may be included in the compensation period P_C. In other words, the write period P_W may overlap with the compensation period P_C. For example, the write period P_W may be 1 horizontal time, each of the initialization period P_INT and the compensation period P_C may be 6 horizontal times, and the non-emission period P_NE may be 26 horizontal times. However, the lengths of each of the periods P_W, P_INT, and P_C are provided as examples, and thus, the present disclosure is not limited thereto.

In the non-emission period P_NE, the emission control signal EM[p] may have a high level. In this case, the fifth pixel transistor T5 and the sixth pixel transistor T6 may be turned off in response to the high level of emission control signal EM[p], and the first pixel PX1 may not emit light.

In the initialization period P_INT, the second scan signal GI[p] may have a high level. In this case, the fourth pixel transistor T4 may be turned on in response to the high level of second scan signal GI[p], and the first initialization power voltage Vint1 of the second power line PL2 may be provided to the first node N1 (e.g., the gate electrode of the first pixel transistor T1).

Thereafter, during the compensation period P_C, the fourth scan signal GC[p] may have a high level. The third pixel transistor T3 may be turned on in response to the high level of fourth scan signal GC[p], and the first pixel transistor T1 may be diode-connected.

In the write period P_W, the first scan signal GW[p] may have a low level. In this case, the second pixel transistor T2 may be turned on in response to the low level of first scan signal GW[p], and the data signal may be provided to the second node N2 from the data line Di. In addition, because the third pixel transistor T3 is turned on in response to the high level of fourth scan signal GC[p], the data signal may be transmitted from the second node N2 to the first node N1 through the first pixel transistor T1 and the third pixel transistor T3. Because the first pixel transistor T1 maintains or substantially maintains the diode-connected state by the turned-on third pixel transistor T3, the voltage of the first node N1 may have a voltage obtained by compensating for a threshold voltage of the first pixel transistor T1 from the data signal.

Before the write period P_W, the third scan signal GB[p] may have a low level. In this case, the seventh pixel transistor T7 may be turned on in response to the low level of third scan signal GB[p], and the second initialization power voltage Vint2 may be supplied to the first electrode of the first light emitting element LD1. The third scan signal GB[p] may be the first scan signal provided to a previous row, but the present disclosure is not limited thereto.

Thereafter, the non-emission period P_NE may be ended, and the emission control signal EM[p] may have a low level. In this case, the fifth pixel transistor T5 and the sixth pixel transistor T6 may be turned on in response to the low level of emission control signal EM[p], and a current movement path is formed from the first power line PL1 to the electrode EP through the fifth pixel transistor T5, the first pixel transistor T1, the sixth pixel transistor T6, and the first light emitting element LD1. Thus, a driving current corresponding to the voltage (e.g., the data signal) of the first node N1 may flow through the first light emitting element LD1 according to an operation of the first pixel transistor T1, and the first light emitting element LD1 may emit light having a desired luminance corresponding to the driving current.

In a reset period P_RST before the k-th frame period FRAME_k, the reset signal RST may have a high level. When a user's fingerprint sensing request is generated, the reset circuit 221 (e.g., refer to FIG. 2) may provide the high level of reset signal RST to the reset control line RSTL. The third sensor transistor M3a of the first photo sensor PHS1 may be turned on in response to the high level of reset signal RST, and the reset voltage VRST may be applied to the fifth node N5. Accordingly, the voltage of the fifth node N5 may be reset by the reset voltage VRST.

Thereafter, the third sensor transistor M3a may be turned off in response to a low level of reset signal RST. When light is incident on the first light receiving element LRD1 during an exposure time EIT, the voltage of the fifth node N5 may change due to the photoelectric conversion function of the first light receiving element LRD1.

In a sensing scan period P_SC of the k-th frame period FRAME_k, the sensing signal SCAN[p], or in other words, the first scan signal GW[p] may have a low level. The sensing scan period P_SC may be the same or substantially the same as the write period P_W. The second sensor transistor M2 may be turned on in response to the first scan signal GW[p], and a current (e.g., a detection value) may flow from the fifth power line PL5 to the readout line RXj in response to the voltage of the fifth node N5.

For example, when the user's fingerprint sensing request is generated on the display panel 100, a current corresponding to the light reflected by the user (e.g., the user's finger), or in other words, the detection value, may be output in the k-th frame period FRAME_k. For example, the user's fingerprint may be sensed based on the detection value.

Figure 10:
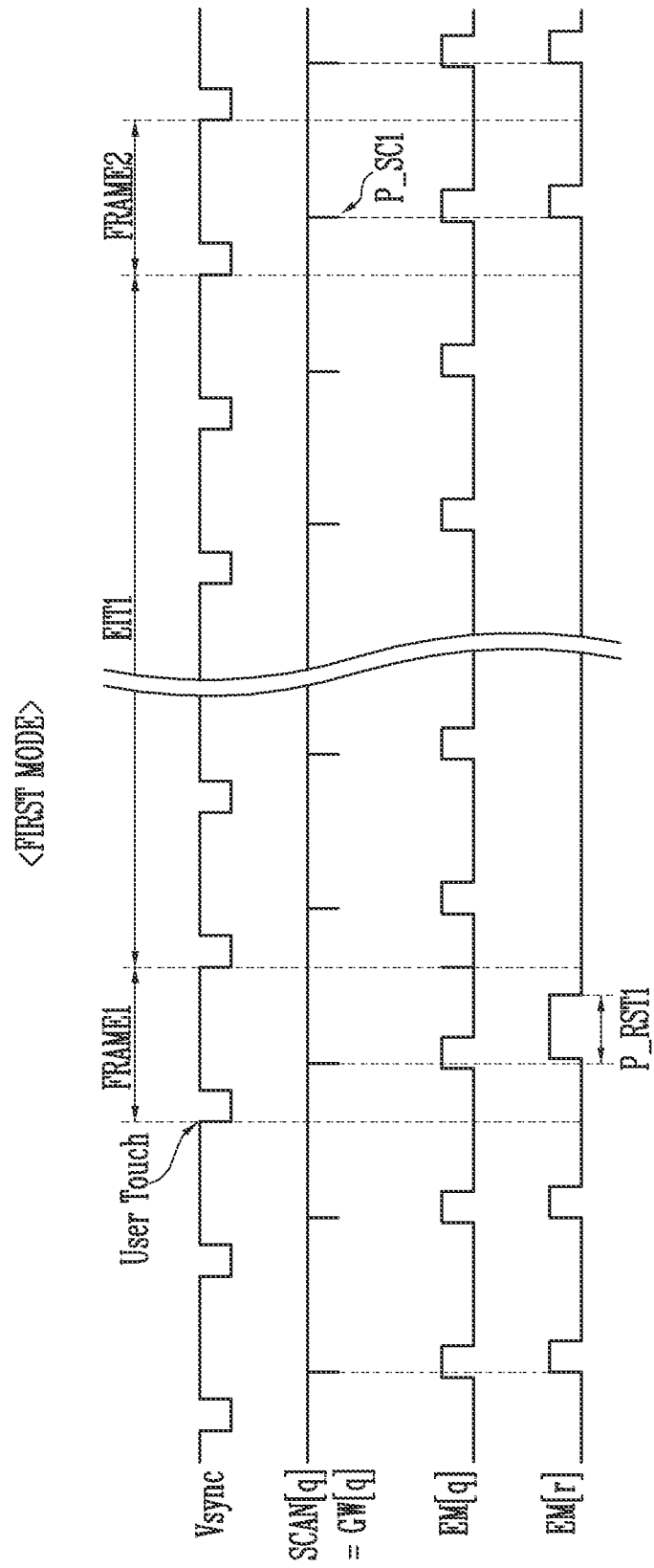
FIG. 10 is a waveform diagram illustrating an example of an operation in a first mode of the second pixel and the second photo sensor of FIG. 7.

FIG. 10 is a waveform diagram illustrating an example of an operation in the first mode of the second pixel and the second photo sensor of FIG. 7. In FIG. 10, an operation of the pixel and the photo sensor disposed in the second row (e.g., the second row R2 of FIG. 4) of the display area (e.g., the display area AA of FIG. 2) is illustrated.

In FIG. 10, the first mode may be a mode in which the display device (e.g., the display device 1000 of FIG. 2) senses the user's fingerprint based on the sensing signal output through the second photo sensor (e.g., the second photo sensor PHS2 of FIG. 7).

For convenience of illustration, FIG. 10 shows the first scan signal GW[q] and the emission control signals EM[q] and EM[r] from among the signals provided to the display panel (e.g., the display panel 100 of FIG. 2), but the second to fourth scan signals (e.g., the second to fourth scan signals GI[q], GB[q], and GC[q] of FIG. 7) having waveforms that are the same or substantially the same as (or similar to) those of the second to fourth scan signals GI[p], GB[p], and GC[p] described above with reference to FIG. 9 may be provided to the display panel for each frame in response to a corresponding horizontal line (e.g., the q-th horizontal line). In other words, because the operation of the second pixel PX2 (e.g., refer to FIG. 7) in each of frame periods FRAME1 and FRAME2 of FIG. 10 may be the same or substantially the same as (or similar to) the operation of the first pixel PX1 (e.g., refer to FIG. 6) in the k-th frame period FRAME_k described above with reference to FIG. 9, redundant description thereof may not be repeated, and the operation of the second photo sensor PHS2 may be described in more detail hereinafter.

Referring to FIGS. 1, 2, 4, 7, and 10, the vertical synchronization signal Vsync may be a signal indicating a start of frame data (e.g., data corresponding to a frame period in which one frame image is displayed), and may be provided or supplied to the display device 1000 at a suitable frequency corresponding to a frame frequency (e.g., included in the control signal CS supplied to the controller 214 described above with reference to FIG. 2).

In addition, the first scan signal GW[q] may be provided to the q-th first scan line S1q (e.g., the second sub-scan line S1q), the emission control signal EM[q] may be provided to the q-th emission control line Eq (e.g., the second emission control line Eq), and the emission control signal EM[r] may be provided to the r-th emission control line Er (e.g., the third emission control line Er).

In an embodiment, in the first mode for sensing the user's fingerprint as described above, the emission driver 212 may vary a driving frequency of the emission control signal EM[r] supplied to the third emission control line Er. For example, in the first mode, the emission driver 212 may decrease the driving frequency of the emission control signal EM[r] that is supplied to the third emission control line Er in response to the fingerprint sensing frequency.

Before the first frame period FRAME1 (or at a start point of the first frame period FRAME1), when the user's fingerprint sensing request is generated, the controller 214 may control the emission driver 212 to vary a supply time of the emission control signal EM[r] that is supplied to the third emission control line Er disposed in the second row R2 and electrically connected to the second photo sensor PHS2 from among the emission control lines E1 to En. For example, a length of a period in which the emission control signal EM[r] supplied from the emission driver 212 through the third emission control line Er is maintained or substantially maintained at a high level may be increased. For example, the length of the period in which the emission control signal EM[r] supplied through the third emission control line Er is maintained or substantially maintained at the high level may be longer than a length of a period in which the emission control signals (e.g., the emission control signal EM[q]) supplied through other emission control lines (e.g., the second emission control line Eq) are maintained or substantially maintained at a high level.

In response to the user's fingerprint sensing request before the first frame period FRAME1 (or at the start point of the first frame period FRAME1), the emission control signal EM[r] supplied through the third emission control line Er may have a high level in a first reset period P_RST1. In other words, when the user's fingerprint sensing request is generated, the emission driver 212 may provide the high level of the emission control signal EM[r] to the third emission control line Er in response to the first reset period P_RST1. The third sensor transistor M3b of the second photo sensor PHS2 may be turned on in response to the high level of the emission control signal EM[r], and the reset voltage VRST may be applied to the fifth node N5. Accordingly, the voltage of the fifth node N5 may be reset by the reset voltage VRST.

As described above, because the length of the high level period of the emission control signal EM[r] supplied through the third emission control line Er in response to the user's fingerprint sensing request is increased, a reset time of the second photo sensor PHS2 (e.g., a time when the fifth node N5 is reset by the reset voltage VRST) before a subsequent first exposure time EIT1 may be sufficiently secured.

Thereafter, the low level of emission control signal EM[r] may be supplied to the third emission control line Er, and the third sensor transistor M3b may be turned off in response to the low level of emission control signal EM[r]. When light is incident on the second light receiving element LRD2 during the first exposure time EIT1, the voltage of the fifth node N5 may change due to the photoelectric conversion function of the second light receiving element LRD2.

In a first sensing scan period P_SC1 of the second frame period FRAME2, the sensing signal SCAN[q], or in other words, the first scan signal GW[q] supplied to the second sub-scan line S1q, may have a low level. The second sensor transistor M2 may be turned on in response to the first scan signal GW[q], and a current (e.g., a detection value) may flow from the fifth power line PL5 to the readout line RXj in response to the voltage of the fifth node N5.

For example, when the user's fingerprint sensing request is generated on the display panel 100, a current corresponding to the light reflected by the user (e.g., the user's finger), or in other words, the detection value, may be output in the second frame period FRAME2. For example, the user's fingerprint may be sensed based on the detection value.

Figure 11:
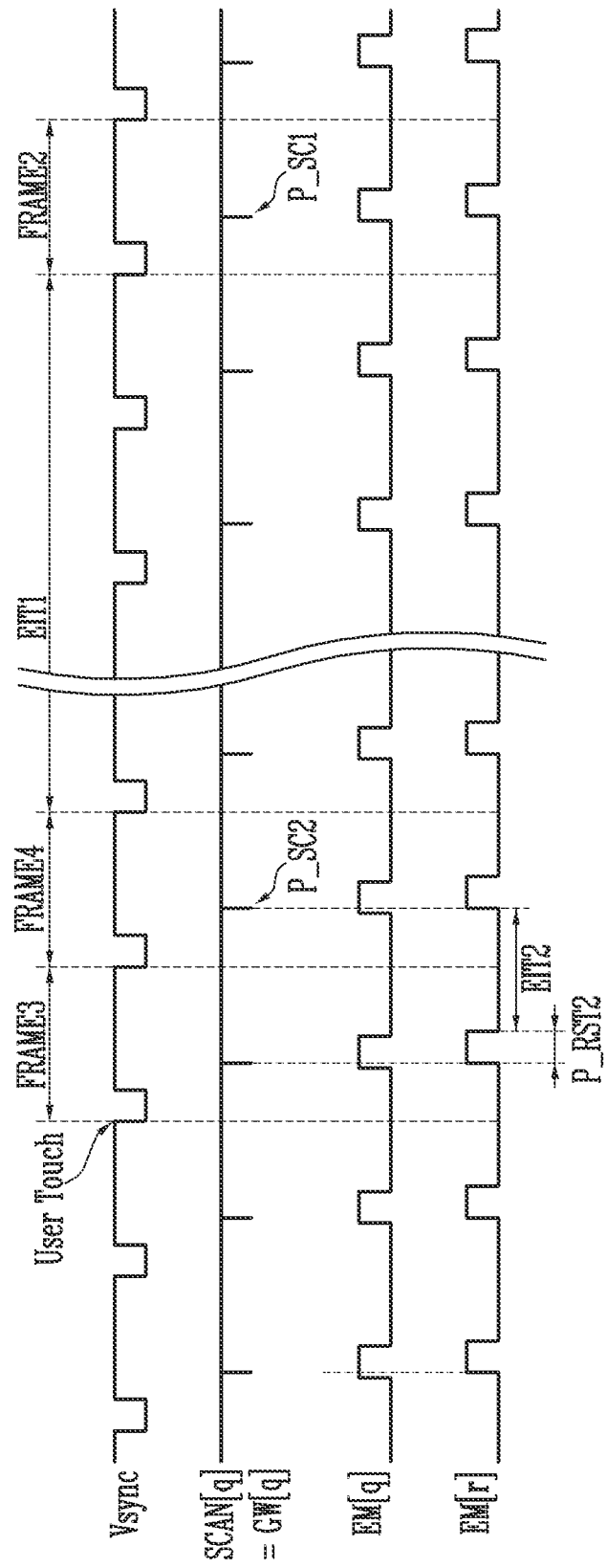
FIG. 11 is a waveform diagram illustrating an example of an operation in a second mode of the second pixel and the second photo sensor of FIG. 7.

FIG. 11 is a waveform diagram illustrating an example of the operation in the second mode of the second pixel and the second photo sensor of FIG. 7. In FIG. 11, the operation of the pixel and the photo sensor disposed in the second row (e.g., the second row R2 of FIG. 4) of the display area (e.g., the display area AA of FIG. 2) is illustrated.

In FIG. 11, the second mode may be a mode in which the display device (e.g., the display device 1000 of FIG. 2) senses the user's touch based on the sensing signal output through the second photo sensor (e.g., the second photo sensor PHS2 of FIG. 7).

For convenience of illustration, FIG. 11 shows the first scan signal GW[q] and the emission control signals EM[q] and EM[r] from among the signals provided to the display panel (e.g., the display panel 100 of FIG. 2), but the second to fourth scan signals (e.g., the second to fourth scan signals GI[q], GB[q], and GC[q] of FIG. 7) having waveforms that are the same or substantially the same as (or similar to) those of the second to fourth scan signals GI[p], GB[p], and GC[p] described above with reference to FIG. 9 may be provided to the display panel for each frame in response to a corresponding horizontal line (e.g., the q-th horizontal line). In other words, because the operation of the second pixel PX2 (e.g., refer to FIG. 7) in each of frame periods FRAME3 and FRAME4 in FIG. 11 is the same or substantially the same as (or similar to) the operation of the first pixel PX1 (e.g., refer to FIG. 6) in the k-th frame period FRAME_k described above with reference to FIG. 9, redundant description thereof may not be repeated, and the operation of the second photo sensor PHS2 may be described in more detail hereinafter.

For convenience, with reference to FIG. 11, redundant description as those above with reference to FIG. 10 may not be repeated.

Referring to FIGS. 1, 2, 4, 7, and 11, the first scan signal GW[q] may be provided to the q-th first scan line S1q (e.g., the second sub-scan line S1q), the emission control signal EM[q] may be provided to the q-th emission control line Eq (e.g., the second emission control line Eq), and the emission control signal EM[r] may be provided to the r-th emission control line Er (e.g., the third emission control line Er).

In an embodiment, in the second mode for sensing the user's touch as described above, the emission driver 212 may vary a driving frequency of the emission control signal EM[r] supplied to the third emission control line Er. For example, in the second mode, the emission driver 212 may control the driving frequency of the emission control signal EM[r] that is supplied to the third emission control line Er to correspond to the touch driving frequency.

According to an embodiment, the touch driving frequency may be the same or substantially the same as the driving frequency (e.g., the frame frequency) of the display device 1000.

When the touch driving frequency is the same or substantially the same as the driving frequency (e.g., the frame frequency) of the display device 1000, the emission driver 212 may not separately control the driving frequency of the emission control signal EM[r] that is supplied to the third emission control line Er. For example, because the emission control signal EM[r] that is supplied to the third emission control line Er is driven at the driving frequency (e.g., the frame frequency) of the display device 1000 as a signal supplied to the pixels PX of the display panel 100, the emission driver 212 may not separately control the driving frequency of the emission control signal EM[r] that is supplied to the third emission control line Er, and may supply the emission control signal EM[r] to the third emission control line Er at the same or substantially the same frequency as that of the emission control signals supplied to the emission control lines E1 to En.

When the user's touch is generated before the third frame period FRAME3 (or at a start point of the third frame period FRAME3), the emission control signal EM[r] that is supplied through the third emission control line Er in a second reset period P_RST2 may have a high level in response to the user's touch occurrence before the third frame period FRAME3 (or at the start point of the third frame period FRAME3). In other words, when the user's touch is generated, the emission driver 212 may provide the high level of emission control signal EM[r] to the third emission control line Er in response to the second reset period P_RST2. The third sensor transistor M3b of the second photo sensor PHS2 may be turned on in response to the high level of emission control signal EM[r], and the reset voltage VRST may be applied to the fifth node N5. Accordingly, the voltage of the fifth node N5 may be reset by the reset voltage VRST.

On the other hand, unlike from the driving for detecting the biometric information, such as the user's fingerprint, based on the sensing signal, completely resetting the fifth node N5 of the second photo sensor PHS2 by the reset voltage VRST to sense the user's touch from the second photo sensor PHS2 may not be necessarily required in the second mode. For example, in the second mode for sensing the user's touch, because only a presence or an absence of the touch occurrence may be detected, even though the fifth node N5 of the second photo sensor PHS2 is not completely reset by the reset voltage VRST, the touch sensing operation may be performed. Accordingly, when the display device 1000 is driven in the second mode, the emission driver 212 may drive the emission control lines E1 to En including the third emission control line Er at the frame frequency (or the touch driving frequency). In this case, in the second mode, because the third emission control line Er for controlling a reset operation of the second photo sensor PHS2 is driven at a relatively higher frame frequency (or touch driving frequency), even though the reset time may not be sufficiently secured, an operation of the sensing of the touch through the second photo sensor PHS2 may be performed.

Thereafter, the low level of emission control signal EM[r] may be supplied to the third emission control line Er, and the third sensor transistor M3b may be turned off in response to the low level of emission control signal EM[r]. When light is incident on the second light receiving element LRD2 during a second exposure time EIT2, the voltage of the fifth node N5 may change due to the photoelectric conversion function of the second light receiving element LRD2.

In a second sensing scan period P_SC2 of the fourth frame period FRAME4 after the third frame period FRAME3, the sensing signal SCAN[q], or in other words, the first scan signal GW[q] supplied to the second sub-scan line S1q may have a low level. The second sensor transistor M2 may be turned on in response to the first scan signal GW[q], and a current (e.g., a detection value) may flow from the fifth power line PL5 to the readout line RXj in response to the voltage of the fifth node N5.

For example, when the user's touch is generated on the display panel 100 in the third frame period FRAME3, a current corresponding to the light reflected by the user (e.g., the user's finger), or in other words, the detection value, may be output in the fourth frame period FRAME4 after (e.g., immediately after) the third frame period FRAME3. For example, the user's touch may be sensed based on the detection value.

Figure 12:
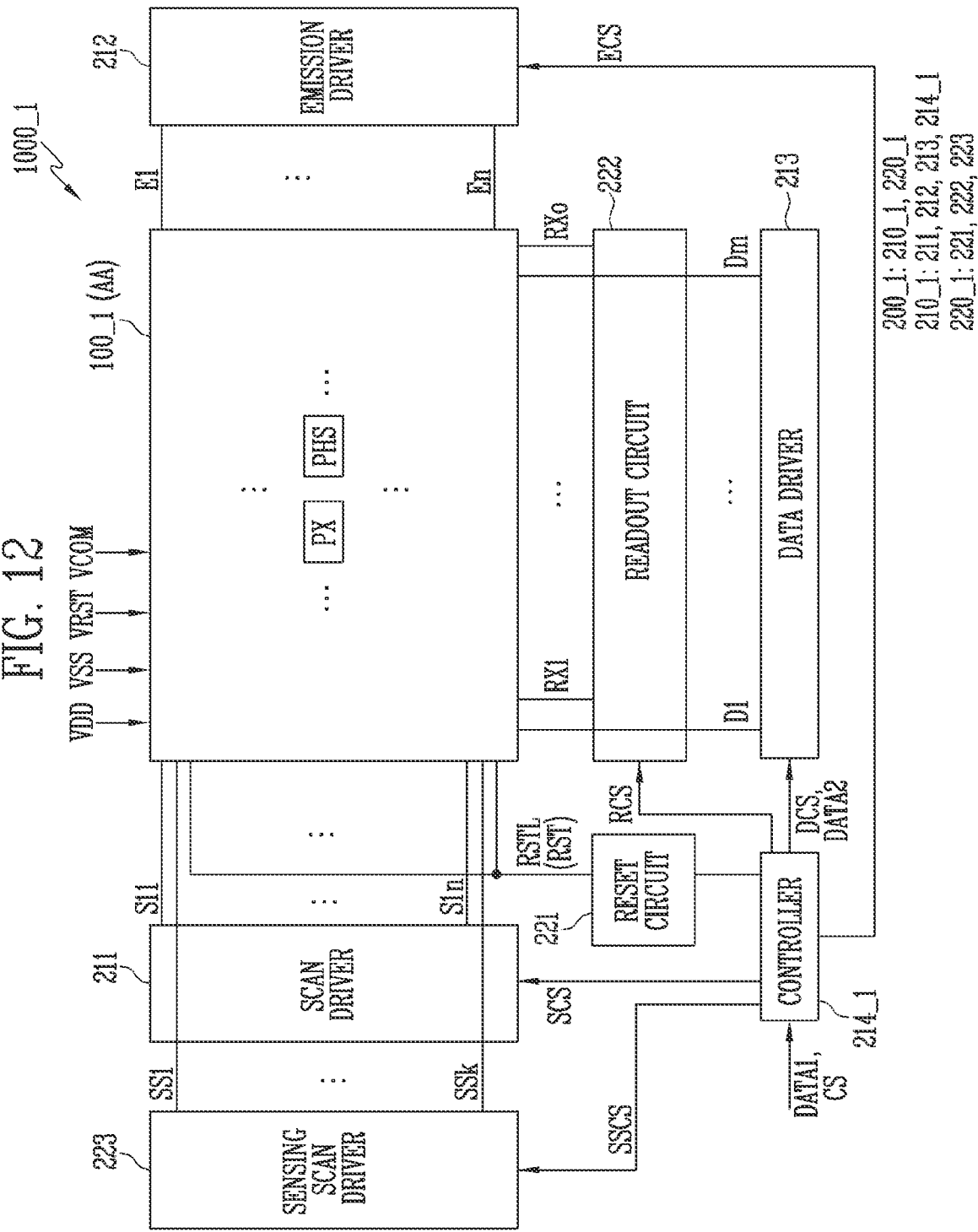
FIG. 12 is a block diagram illustrating a display device according to one or more embodiments of the present disclosure.
Figure 13:
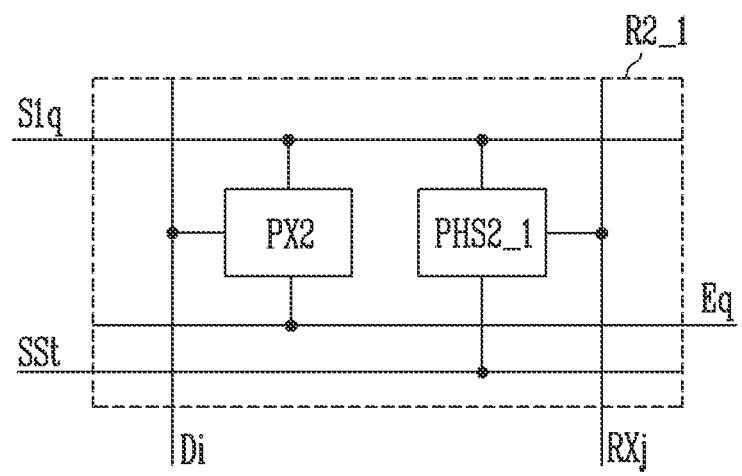
FIG. 13 is a diagram illustrating an example of dispositions of a second pixel and a second photo sensor in a second row of a display area of a display panel included in the display device of FIG. 12.

FIG. 12 is a block diagram illustrating a display device according to embodiments of the disclosure. FIG. 13 is a diagram illustrating an example of dispositions of a second pixel and a second photo sensor in a second row of a display area of a display panel included in the display device of FIG. 12.

In FIGS. 12 and 13, the same or substantially the same (or similar) components as those described above are denoted the same (or similar) reference symbols, and thus, the differences therebetween may be mainly described hereinafter, and redundant description thereof may not be repeated.

FIG. 12 illustrates an embodiment in which a sensing scan driver 223 may be included, which may be different from the embodiment described above with reference to FIG. 2.

FIG. 13 illustrates an embodiment, in which a second photo sensor PHS2_1 may be different from that of the embodiment illustrated in FIG. 4.

Referring to FIG. 12, the display device 1000_1 may include a display panel 100_1 and a driving circuit 200_1.

In an embodiment, the second photo sensor from among the photo sensors PHS included in the display panel 100_1 may be electrically connected to one of the first scan lines S11 to S1n, one of the readout lines RX1 to RXo, and at least one of sensing scan lines SS1 to SSk. Here, k may be a natural number.

Referring further to FIG. 13, the second pixel PX2 and the second photo sensor PHS2_1 that are disposed in a second row R2_1 of the display area AA of the display panel 100_1 are illustrated.

The second row R2_1 illustrated in FIG. 13 may correspond to the q-th pixel row from among the plurality of pixel rows.

The second photo sensor PHS2_1 may be electrically connected to the q-th first scan line S1q (hereinafter, referred to as the second sub-scan line) from among the first scan lines S11 to S1n, and the j-th readout line RXj (hereinafter, referred to as the readout line) from among the readout lines RX1 to RXo.

In an embodiment, the second photo sensor PHS2_1 may be electrically connected to a t-th sensing scan line SSt (hereinafter, referred to as a sensing scan line SSt) from among the sensing scan lines SS1 to SSk. Here, t may be a natural number. For example, t may be a natural number that is less than k, but the present disclosure is not limited thereto.

The second photo sensor PHS2_1 may output an electrical signal (e.g., the sensing signal, such as the current/voltage) corresponding to the light sensed by the readout line RXj, based on the first scan signal provided to the second sub scan line S1q and the sensing scan signal provided to the sensing scan line SSt. The user's fingerprint or the user's touch may be sensed based on the sensing signal output through the second photo sensor PHS2_1. For example, when the display device 1000_1 is driven in the first mode, the user's fingerprint may be sensed based on the sensing signal output through the second photo sensor PHS2_1, and when the display device 1000_1 is driven in the second mode, the user's touch may be sensed based on the sensing signal output through the second photo sensor PHS2_1.

The driving circuit 200_1 may include a panel driver 210_1 and a sensor driver 220_1.

The driving circuit 200_1 may include a scan driver 211 (e.g., a gate driver), an emission driver 212, a data driver 213 (e.g., a source driver), a controller 214_1 (e.g., a timing controller), a reset circuit 221 (e.g., a reset unit), a readout circuit 222 (e.g., a readout unit), and the sensing scan driver 223. For example, the scan driver 211, the emission driver 212, the data driver 213, and the controller 214_1 may be included in the panel driver 210_1, and the reset circuit 221, the readout circuit 222, and the sensing scan driver 223 may be included in the sensor driver 220_1, but the present disclosure is not limited thereto. For example, the reset circuit 221 and the sensing scan driver 223 may be included in the panel driver 210_1.

The controller 214_1 may receive the input image data DATA1 and the control signal CS from an external device (e.g., a graphic processor or an application processor), and may generate the scan control signal SCS, the emission driving control signal ECS, the data control signal DCS, and a sensing scan control signal SSCS based on the control signal CS.

The sensing scan driver 223 may be electrically connected to at least a portion of the photo sensors PHS through the sensing scan lines SS1 to SSk. For example, as described above with reference to FIG. 13, from among the photo sensors PHS, the second photo sensor PHS2_1 disposed in the second row R2_1 of the display area AA of the display panel 100_1 may be electrically connected to the sensing scan driver 223 through the scan line SSt to receive a sensing scan signal from the sensing scan driver 223.

The sensing scan driver 223 may generate the sensing scan signal based on the sensing scan control signal SSCS, and may provide the sensing scan signal to the sensing scan lines SS1 to SSk. Here, the sensing scan control signal SSCS may include a start signal, clock signals, and the like, and may be provided from the controller 214_1 to the sensing scan driver 223. For example, the sensing scan driver 223 may be implemented as a shift register that generates and outputs the sensing scan signals by sequentially shifting a start signal of a pulse shape using the clock signals. In other words, the sensing scan driver 223 may selectively drive the photo sensor PHS (e.g., the second photo sensor PHS2_1 of FIG. 13), while scanning the display panel 100_1.

The photo sensor PHS that is selectively driven by the sensing scan driver 223 may output an electrical signal (e.g., a sensing signal, such as a current/voltage) corresponding to the sensed light to the readout line.

For example, the second photo sensor PHS2_1 that is selectively driven through the first sub-scan line S1p of FIG. 13 may output the electrical signal corresponding to the sensed light to the readout line RXj.

In an embodiment, the controller 214_1 may vary a driving frequency of the sensing scan driver 223. For example, a frequency at which the sensing scan driver 223 supplies the sensing scan signal to the sensing scan lines SS1 to SSk may be varied, based on the sensing scan control signal SSCS supplied from the controller 214_1.

For example, when the display device 1000_1 is driven in the first mode such that the user's fingerprint is sensed based on the sensing signal output through the second photo sensor PHS2_1, the sensing scan driver 223 may control (e.g., may vary) a driving frequency of the sensing scan signal supplied to the sensing scan lines SS1 to SSk to correspond to the fingerprint sensing frequency. For example, the driving frequency of the sensing scan signals supplied to the sensing scan lines SS1 to SSk through the sensing scan driver 223 may be the same or substantially the same as (or similar to) a driving frequency of the reset signal RST supplied to the reset control line RSTL through the reset circuit 221.

In addition, when the display device 1000_1 is driven in the second mode such that the user's touch is sensed based on the sensing signal output through the second photo sensor PHS2_1, the sensing scan driver 223 may control (e.g., may vary) the driving frequency of the sensing scan signal supplied to the sensing scan lines SS1 to SSk to correspond to the touch driving frequency.

Figure 14:
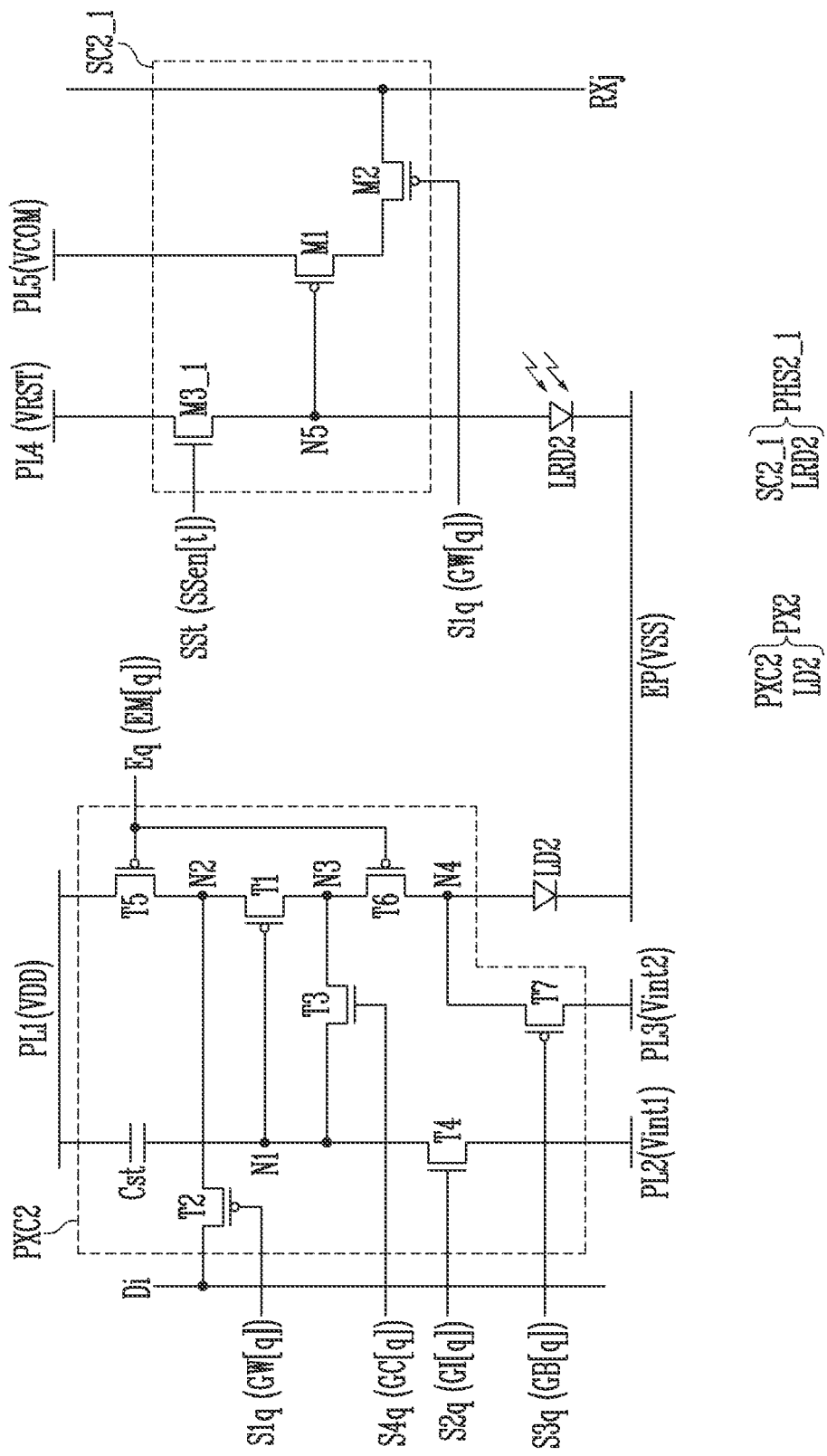
FIG. 14 is an equivalent circuit diagram of an example of the second pixel and the second photo sensor of FIG. 13.
Figure 15:
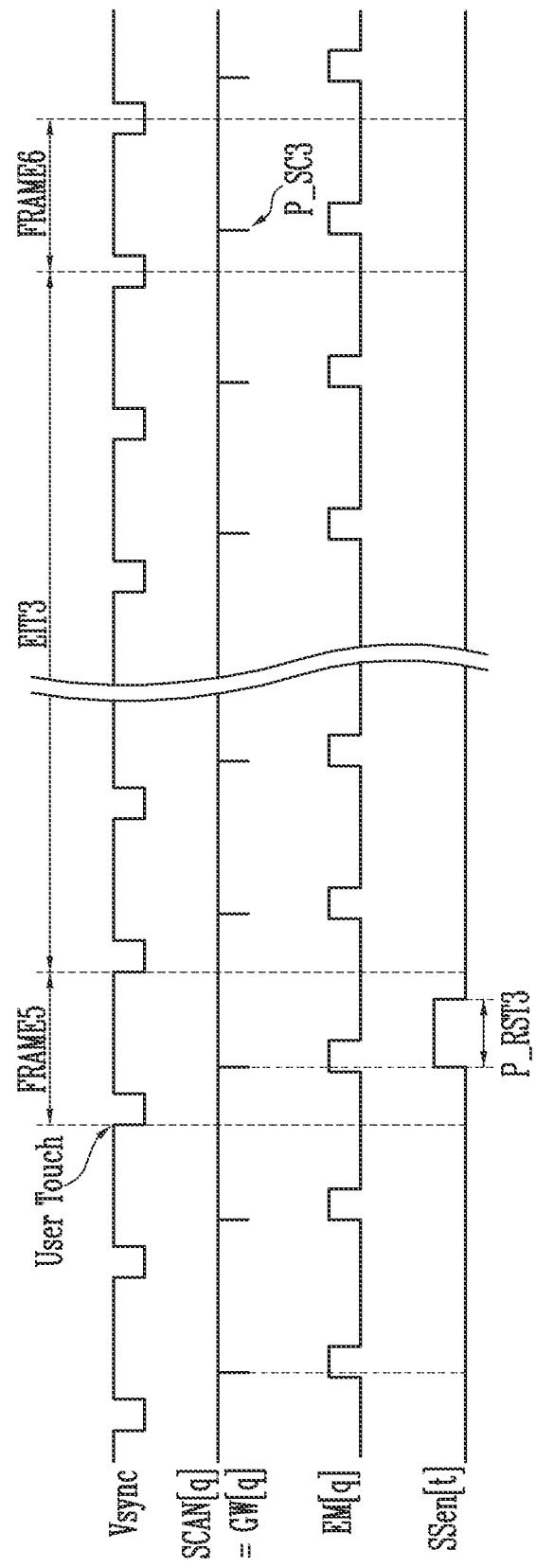
FIG. 15 is a waveform diagram illustrating an example of an operation in the first mode of the second pixel and the second photo sensor of FIG. 14.

FIG. 14 is an equivalent circuit diagram of an example of the second pixel and the second photo sensor of FIG. 13. FIG. 15 is a waveform diagram illustrating an example of an operation in the first mode of the second pixel and the second photo sensor of FIG. 14. FIG. 16 is a waveform diagram illustrating an example of an operation in the second mode of the second pixel and the second photo sensor of FIG. 14.

In FIGS. 14 to 16, the same or substantially the same (or similar) components as those described above are denoted the same (or similar) reference symbols, and thus, the differences therebetween may be mainly described hereinafter, and redundant description thereof may not be repeated.

FIG. 14 illustrates an embodiment in which a connection configuration of a second sensor circuit SC2_1 may be different from that described above with reference to FIG. 7.

Each of FIGS. 15 and 16 illustrates an embodiment in which a sensing scan signal SSen[t] is illustrated.

In FIG. 14, the same or substantially the same (or similar) components as those described above with reference to FIG. 7 are denoted the same (or similar) reference symbols, and thus, the differences therebetween may be mainly described hereinafter, and redundant description thereof may not be repeated.

Referring to FIGS. 12 to 14, the second pixel PX2 and the second photo sensor PHS2_1 may be disposed in the second row R2_1 (e.g., the q-th horizontal line).

The second photo sensor PSH2_1 may include the second light receiving element LRD2 and the second sensor circuit SC2_1. In an embodiment, the second sensor circuit SC2_1 may include first to third sensor transistors M1, M2, and M3_1.

The third sensor transistor M3_1 may be connected between the fourth power line PL4 (e.g., the reference power line) and the fifth node N5. A gate electrode of the third sensor transistor M3_1 may be connected to the sensing scan line SSt.

When the third sensor transistor M3_1 is turned on in response to a sensing scan signal SSen[t] supplied to the sensing scan line SSt, the reset voltage VRST may be provided to the fifth node N5. For example, the voltage of the fifth node N5 may be reset by the reset voltage VRST.

An operation of the second photo sensor PHS2_1 will be described in more detail with reference to FIGS. 15 and 16.

First, referring further to FIG. 15, which illustrates the operation of the second photo sensor PHS2_1 in the first mode, the first mode may be a mode in which the display device (e.g., the display device 1000_1 of FIG. 12) senses the user's fingerprint based on the sensing signal output through the second photo sensor (e.g., the second photo sensor PHS2_1 of FIG. 14).

When the user's fingerprint sensing request is generated before a fifth frame period FRAME5 (or at a start point of the fifth frame period FRAME5), the sensing scan signal SSen[t] may have a high level in a third reset period P_RST3.

The third sensor transistor M3_1 of the second photo sensor PHS2_1 may be turned on in response to the high level of sensing scan signal SSen[t], and the reset voltage VRST may be applied to the fifth node N5. Accordingly, the voltage of the fifth node N5 may be reset by the reset voltage VRST.

Here, in the first mode, the sensing scan driver 223 may be controlled, so that the driving frequency of the sensing scan signal supplied to the sensing scan lines SS1 to SSk corresponds to the fingerprint sensing frequency in response to the user's fingerprint sensing request. Here, as described above, the fingerprint sensing frequency may be relatively less than the driving frequency (e.g., the frame frequency) of the display device 1000_1. Accordingly, because a fingerprint sensing period may be increased, a length of a period in which the sensing scan signal (e.g., the sensing scan signal SSen[t] supplied to the sensing scan line SSt) has a high level may be sufficiently long. In other words, the length of the period in which the sensing scan signal (e.g., the sensing scan signal SSen[t] supplied to the sensing scan line SSt) has the high level may be sufficiently secured, so that a reset time (e.g., a time when the fifth node N5 is reset by the reset voltage VRST) of the second photo sensor PHS2_1 before a third exposure time EIT3 is sufficiently secured.

Thereafter, the low level of sensing scan signal SSen[t] may be supplied, and the third sensor transistor M3_1 may be turned off in response to the low level of sensing scan signal SSen[t]. When light is incident on the second light receiving element LRD2 during the third exposure time EIT3, the voltage of the fifth node N5 may change due to the photoelectric conversion function of the second light receiving element LRD2.

In a third sensing scan period P_SC3 of a sixth frame period FRAME6, the sensing signal SCAN[q]), or in other words, the first scan signal GW[q] supplied to the second sub-scan line S1q, may have a low level. The second sensor transistor M2 may be turned on in response to the first scan signal GW[q], and a current (e.g., a detection value) may flow from the fifth power line PL5 to the readout line RXj in response to the voltage of the fifth node N5.

For example, when the user's fingerprint sensing request is generated on the display panel 100_1, a current corresponding to the light reflected by the user (e.g., the user's finger), or in other words, the detection value, may be output in the sixth frame period FRAME6. For example, the user's fingerprint may be sensed based on the detection value.

Next, referring further to FIG. 16, the second mode may be a mode in which the display device (e.g., the display device 1000_1 of FIG. 12) senses the user's touch based on the sensing signal output through the second photo sensor (e.g., the second photo sensor PHS2_1 of FIG. 14).

When the user's touch is generated before a seventh frame period FRAME7 (or at a start point of the seventh frame period FRAME7), the sensing scan signal SSen[t] may have a high level in a fourth reset period P_RST4.

The third sensor transistor M3_1 of the second photo sensor PHS2_1 may be turned on in response to the high level of sensing scan signal SSen[t], and the reset voltage VRST may be applied to the fifth node N5. Accordingly, the voltage of the fifth node N5 may be reset by the reset voltage VRST.

Here, in the second mode, the sensing scan driver 223 may be controlled, so that the driving frequency of the sensing scan signal supplied to the sensing scan lines SS1 to SSk corresponds to the touch driving frequency. Here, as described above, the touch driving frequency may be the same or substantially the same as the driving frequency (e.g., the frame frequency) of the display device 1000_1. For example, a frequency of the sensing scan signal SSen[t] may be the same or substantially the same as the driving frequency of the display device (e.g., the frequency of the first scan signal GW[q] supplied to the second sub-scan line S1q).

Thereafter, the low level of sensing scan signal SSen[t] may be supplied, and the third sensor transistor M3_1 may be turned off in response to the low level of sensing scan signal SSen[t]. When light is incident on the second light receiving element LRD2 during a fourth exposure time EIT4, the voltage of the fifth node N5 may change due to the photoelectric conversion function of the second light receiving element LRD2.

In a fourth sensing scan period P_SC4 of an eighth frame period FRAME8 after a seventh frame period FRAME7, the sensing signal SCAN[q]), or in other words, the first scan signal GW[q] supplied to the second sub-scan line S1q, may have a low level. The second sensor transistor M2 may be turned on in response to the first scan signal GW[q], and a current (e.g., a detection value) may flow from the fifth power line PL5 to the readout line RXj in response to the voltage of the fifth node N5.

For example, when the user's touch is generated on the display panel 100_1 in the seventh frame period FRAME7, a current corresponding to the light reflected by the user (e.g., the user's finger), or in other words, the detection value, may be output in the eighth frame period FRAME8 after (e.g., immediately after) the seventh frame period FRAME7. For example, the user's touch may be sensed based on the detection value.

The display device according to one or more embodiments of the present disclosure may sense fingerprint information and may sense a touch concurrently (e.g., simultaneously or substantially simultaneously) with each other by receiving reflected light or the like through a photo sensor (e.g., a second photo sensor). Accordingly, the display device (e.g., the display panel) may be simplified.

In addition, the display device according to one or more embodiments of the present disclosure may vary the length of the period in which the emission control signal and/or the sensing scan signal for controlling a reset operation of the photo sensor (e.g., the second photo sensor) has the high level, according to the first mode and the second mode. Accordingly, a reset time may be sufficiently secured in sensing the fingerprint information.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
   a display panel comprising scan lines, emission control lines, a readout line, and a reset control line;
   a scan driver configured to provide scan signals to the scan lines;
   an emission driver configured to provide emission control signals to the emission control lines; and
   a readout circuit configured to receive a sensing signal from the readout line in response to the scan signals,
   wherein the display panel further comprises:
      a first pixel in a first row of a display area, and connected to a first sub-scan line from among the scan lines, and a first emission control line from among the emission control lines;
      a first photo sensor in the first row, and connected to the first sub-scan line, the reset control line, and the readout line;
      a second pixel in a second row of the display area, and connected to a second sub-scan line from among the scan lines, and a second emission control line from among the emission control lines; and
      a second photo sensor in the second row, and connected to the second sub-scan line, a third emission control line from among the emission control lines, and the readout line, and
   wherein the third emission control line is configured to transmit an emission control signal from among the emission control signals to a gate electrode of a sub-sensor transistor of the second photo sensor, the gate electrode being connected to the third emission control line.

2. The display device according to claim 1, wherein:
   the display area of the display panel is divided into a plurality of pixel rows;
   at least a portion of the plurality of pixel rows corresponds to the second row; and
   a remaining portion of the plurality of pixel rows corresponds to the first row.

3. The display device according to claim 2, wherein the first sub-scan line corresponds to a p-th scan line from among the scan lines, where p is a natural number, and
   wherein the second sub-scan line corresponds to a q-th scan line from among the scan lines, where q is a natural number.

4. The display device according to claim 3, wherein:
   the first emission control line corresponds to a p-th emission control line from among the emission control lines;
   the second emission control line corresponds to a q-th emission control line from among the emission control lines; and
   the third emission control line corresponds to an r-th emission control line from among the emission control lines, where r is a natural number less than q.

5. The display device according to claim 1, wherein the first photo sensor comprises:
   a first light receiving element;
   a first sub-sensor transistor configured to control a current flowing to the readout line in response to a voltage of an electrode of the first light receiving element;
   a second sub-sensor transistor electrically connected between the first sub-sensor transistor and the readout line, and including a gate electrode connected to the first sub-scan line; and
   a third sub-sensor transistor electrically connected between a reference power line and the electrode of the first light receiving element, and including a gate electrode connected to the reset control line.

6. The display device according to claim 5, wherein the second photo sensor comprises:
   a second light receiving element;
   a fourth sub-sensor transistor configured to control a current flowing to the readout line in response to a voltage of an electrode of the second light receiving element;
   a fifth sub-sensor transistor electrically connected between the fourth sub-sensor transistor and the readout line, and including a gate electrode connected to the second sub-scan line; and
   a sixth sub-sensor transistor electrically connected between the reference power line and the electrode of the second light receiving element, and including the gate electrode connected to the third emission control line.

7. A display device comprising:
   a display panel comprising scan lines, emission control lines, a readout line, and a reset control line;
   a scan driver configured to provide scan signals to the scan lines;
   an emission driver configured to provide emission control signals to the emission control lines; and
   a readout circuit configured to receive a sensing signal from the readout line in response to the scan signals,
   wherein the display panel further comprises:

a first pixel in a first row of a display area, and connected to a first sub-scan line from among the scan lines, and a first emission control line from among the emission control lines;

a first photo sensor in the first row, and connected to the first sub-scan line, the reset control line, and the readout line;

a second pixel in a second row of the display area, and connected to a second sub-scan line from among the scan lines, and a second emission control line from among the emission control lines; and a second photo sensor in the second row, and connected to the second sub-scan line, a third emission control line from among the emission control lines, and the readout line, and wherein the emission driver is configured to change a frequency of an emission control signal supplied to the third emission control line in response to a first mode and a second mode.

8. The display device according to claim 7, wherein, in the first mode, the emission driver is configured to control the frequency of the emission control signal supplied to the third emission control line to correspond to a frequency of a reset signal supplied to the reset control line.

9. The display device according to claim 8, wherein, in the first mode, the frequency of the emission control signal supplied to the third emission control line is less than a frequency of emission control signals supplied to the first and second emission control lines.

10. The display device according to claim 7, wherein, in the second mode, the emission driver is configured to control the frequency of the emission control signal supplied to the third emission control line to correspond to a frequency at which the scan driver supplies the scan signals to the scan lines.

11. The display device according to claim 1, wherein the emission driver is configured to change a length of a period in which an emission control signal supplied to the third emission control line has a high level in response to a first mode and a second mode.

12. The display device according to claim 11, wherein the length of the period in which the emission control signal supplied to the third emission control line has the high level in the first mode is longer than the length of the period in which the emission control signal supplied to the third emission control line has the high level in the second mode.

13. The display device according to claim 11, wherein the second photo sensor is configured to be reset by a reset voltage supplied from a reference power line in the period in which the emission control signal supplied to the third emission control line has the high level.

14. A display device comprising:
a display panel comprising scan lines, emission control lines, a sensing scan line, a readout line, and a reset control line;
a scan driver configured to provide scan signals to the scan lines;
an emission driver configured to provide emission control signals to the emission control lines;
a sensing scan driver configured to provide a sensing scan signal to the sensing scan line; and
a readout circuit configured to receive a sensing signal from the readout line in response to the scan signals,
wherein the display panel further comprises:
a first pixel in a first row of a display area, and connected to a first sub-scan line from among the scan lines, and a first emission control line from among the emission control lines;
a first photo sensor in the first row, and connected to the first sub-scan line, the reset control line, and the readout line;
a second pixel in a second row of the display area, and connected to a second sub-scan line from among the scan lines, and a second emission control line from among the emission control lines; and
a second photo sensor in the second row, and connected to the second sub-scan line, the sensing scan line, and the readout line, and
wherein the sensing scan line is configured to transmit the sensing scan signal to a gate electrode of a sub-sensor transistor of the second photo sensor, the gate electrode being connected to the sensing scan line.

15. The display device according to claim 14, wherein the first photo sensor comprises:
a first light receiving element;
a first sub-sensor transistor configured to control a current flowing to the readout line in response to a voltage of an electrode of the first light receiving element;
a second sub-sensor transistor electrically connected between the first sub-sensor transistor and the readout line, and including a gate electrode connected to the first sub-scan line; and
a third sub-sensor transistor electrically connected between a reference power line and the electrode of the first light receiving element, and including a gate electrode connected to the reset control line.

16. The display device according to claim 15, wherein the second photo sensor comprises:
a second light receiving element;
a fourth sub-sensor transistor configured to control a current flowing to the readout line in response to a voltage of an electrode of the second light receiving element;
a fifth sub-sensor transistor electrically connected between the fourth sub-sensor transistor and the readout line, and including a gate electrode connected to the second sub-scan line; and
a sixth sub-sensor transistor electrically connected between the reference power line and the electrode of the second light receiving element, and including the gate electrode connected to the sensing scan line.

17. The display device according to claim 14, wherein the sensing scan driver is configured to change a frequency of the sensing scan signal supplied to the sensing scan line in response to a first mode and a second mode.

18. The display device according to claim 17, wherein, in the first mode, the sensing scan driver is configured to control a frequency of the sensing scan signal supplied to the sensing scan line to correspond to a frequency of a reset signal supplied to the reset control line.

19. The display device according to claim 17, wherein, in the second mode, the sensing scan driver is configured to control a frequency of the sensing scan signal supplied to the sensing scan lines to correspond to a frequency at which the scan driver supplies the scan signals to the scan lines.

20. The display device according to claim 14, wherein the sensing scan driver is configured to change a length of a period in which the sensing scan signal supplied to the sensing scan line has a high level in response to a first mode and a second mode.

* * * * *